US012187033B2

(12) United States Patent
Hanamura et al.

(10) Patent No.: US 12,187,033 B2
(45) Date of Patent: Jan. 7, 2025

(54) LIQUID EJECTING SYSTEM AND HEAD UNIT

(71) Applicant: SEIKO EPSON CORPORATION, Tokyo (JP)

(72) Inventors: Yuki Hanamura, Azumino (JP); Takao Yamamoto, Matsumoto (JP); Nobuaki Ito, Shiojiri (JP); Shunya Fukuda, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 149 days.

(21) Appl. No.: 18/047,219

(22) Filed: Oct. 17, 2022

(65) Prior Publication Data

US 2023/0117636 A1 Apr. 20, 2023

(30) Foreign Application Priority Data

Oct. 18, 2021 (JP) ................................ 2021-170339

(51) Int. Cl.
*B41J 2/045* (2006.01)
*B41J 2/025* (2006.01)

(52) U.S. Cl.
CPC ........... *B41J 2/04588* (2013.01); *B41J 2/025* (2013.01)

(58) Field of Classification Search
CPC .... B41J 2/04588; B41J 2/025; B41J 2/04571; B41J 2/04541; B41J 2002/14241; B41J 2002/14354; B41J 2002/14419; B41J 2002/14491; B41J 2/0451; B41J 2/04581; B41J 2/14233
USPC ........................................................... 347/5
See application file for complete search history.

(56) References Cited

U.S. PATENT DOCUMENTS

2005/0057596 A1* 3/2005 Shinkawa ............ B41J 2/16579 347/19
2021/0229421 A1* 7/2021 Murayama ............. B41J 2/0459
2022/0080741 A1* 3/2022 Murayama ........... B41J 2/04581

FOREIGN PATENT DOCUMENTS

JP 2020-044804 A 3/2020

* cited by examiner

*Primary Examiner* — Jason S Uhlenhake
*Assistant Examiner* — Alexander D Shenderson
(74) *Attorney, Agent, or Firm* — WORKMAN NYDEGGER

(57) ABSTRACT

A liquid ejecting system includes a head unit that includes a pressure chamber, a drive element driven by an applied drive waveform, a vibration plate that vibrates by drive of the drive element, and a nozzle through which a liquid is ejected by a pressure applied in the pressure chamber by vibration of the vibration plate, and an input portion to which an input parameter for detecting an ejection failure of the liquid based on residual vibration of the vibration plate is input from a server through a network connection portion.

12 Claims, 19 Drawing Sheets

LIQUID EJECTING SYSTEM AND HEAD UNIT

The present application is based on, and claims priority from JP Application Serial Number 2021-170339, filed Oct. 18, 2021, the disclosure of which is hereby incorporated by reference herein in its entirety.

BACKGROUND

1. Technical Field

The present disclosure relates to a liquid ejecting system and a head unit.

2. Related Art

In a liquid ejecting apparatus such as an ink jet printer, a liquid such as ink is ejected from a head by applying a drive pulse to a drive element such as a piezoelectric element. Therefore, in order to maintain the quality of printing by the printer, it is necessary to detect an ejection failure of a liquid.

For example, JP-A-2020-44804 discloses a technique for detecting residual vibration generated in an ejection portion after driving a drive element by a drive pulse, and detecting an ejection failure of a liquid based on a comparison result between an amplitude of the detected residual vibration and a threshold value.

However, as the drive element deteriorates, the amplitude of the residual vibration becomes smaller. In the technique according to JP-A-2020-44804, when the threshold value is fixed, the amplitude of the residual vibration becomes less than the threshold value due to the deterioration of the drive element even when a normal nozzle is used in the printer. As a result, when the drive element deteriorates to some extent or more, it may not be possible to accurately detect the ejection failure of a liquid. Therefore, in order to accurately detect the ejection failure of the liquid, it is necessary to grasp the degree of deterioration of the drive element.

Incidentally, in recent business models, the manufacturer of the head may be different from the manufacturer of the printer main body, which is an element excluding the head among elements constituting a printer. Since printer usage conditions differ depending on the manufacturer of the printer main body, in the related art, it is difficult for the manufacturer of the head to grasp the degree of deterioration of the drive element. Therefore, it is required to detect the ejection failure of the liquid in the printer by using the function set by the manufacturer of the head, regardless of the deterioration state of the drive element.

Further, when the type of liquid required for a pressure chamber provided in the printer is changed, a threshold value for detecting the ejection failure of the liquid is needed to be changed.

SUMMARY

According to an aspect of the present disclosure, there is provided a liquid ejecting system including a head unit that includes a pressure chamber, a drive element driven by an applied drive waveform, a vibration plate that vibrates by drive of the drive element, and a nozzle through which a liquid is ejected by a pressure applied in the pressure chamber by vibration of the vibration plate, and an input portion to which an input parameter for detecting an ejection failure of the drive element based on residual vibration of the vibration plate is input from a server through a network connection portion.

DESCRIPTION OF EXEMPLARY EMBODIMENTS

Figure 1:
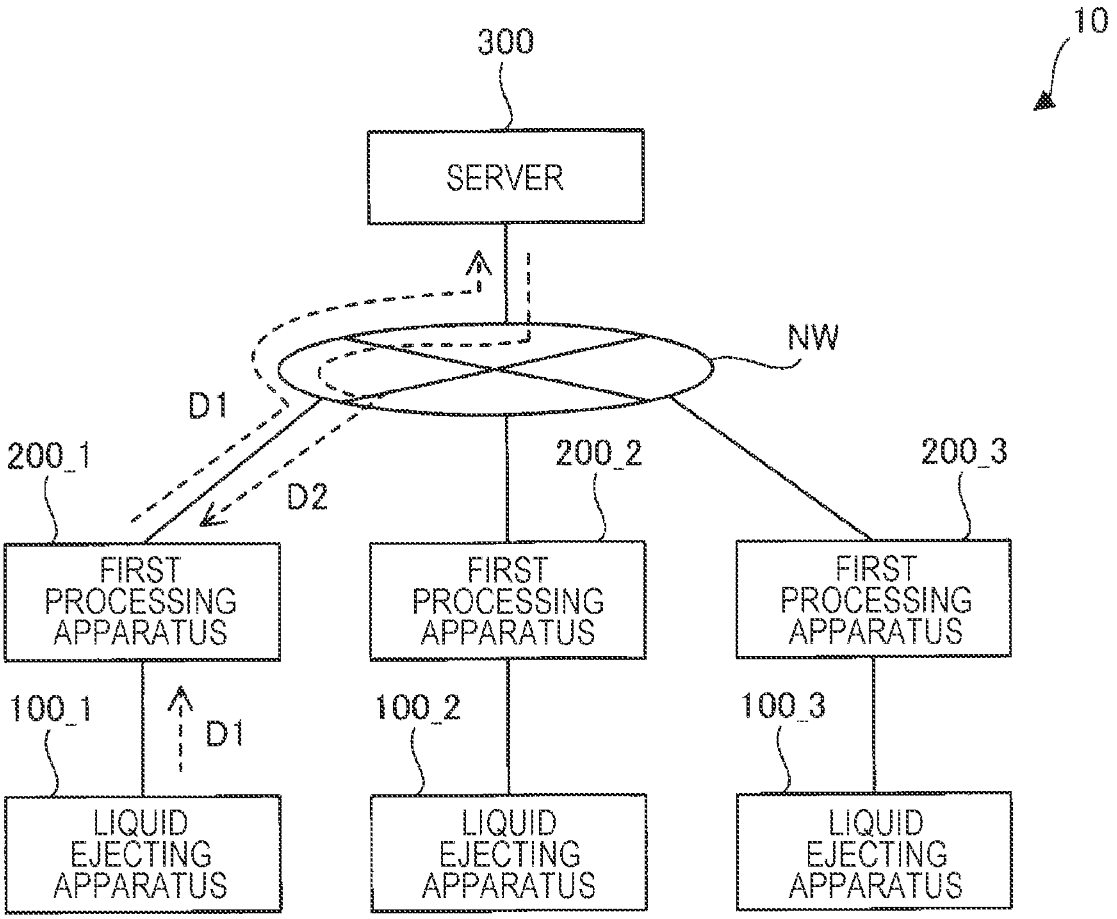
FIG. 1 is a schematic diagram showing a configuration example of a liquid ejecting system according to a first embodiment.

Hereinafter, preferred embodiments according to the present disclosure will be described with reference to the accompanying drawings. In the drawings, the dimensions and scale of each portion are appropriately different from the actual ones, and some portions are schematically shown for easy understanding. Further, the scope of the present disclosure is not limited to these forms unless it is stated in the following description that the present disclosure is particularly limited.

1. FIRST EMBODIMENT

1-1. Outline of Liquid Ejecting System

FIG. 1 is a schematic diagram showing a configuration example of a liquid ejecting system 10 according to a first embodiment. The liquid ejecting system 10 is a system that performs printing by an ink jet method, and has a function of detecting an ejection failure of a liquid. In the example shown in FIG. 1, the liquid ejecting system 10 includes liquid ejecting apparatuses 100_1 to 100_3, first processing apparatuses 200_1 to 200_3, and a server 300. In the following, the liquid ejecting apparatuses 100_1 to 100_3 are collectively referred to as a "liquid ejecting apparatus 100". Similarly, the first processing apparatuses 200_1 to 200_3 are collectively referred to as a "first processing apparatus 200".

Here, the liquid ejecting apparatuses 100_1 to 100_3 are provided by a manufacturer of a printer main body (described later). Each of the liquid ejecting apparatuses 100_1 to 100_3 may be provided by the same manufacturer or may be provided by different manufacturers. The first processing apparatuses 200_1 to 200_3 may be owned by the user or may be provided by the manufacturer of the printer main body. On the other hand, head units 110 incorporated in the liquid ejecting apparatuses 100_1 to 100_3 are provided by the manufacturer of the head (described later). The server 300 is maintained and managed by a head manufacturer.

When a user uses the printer main body, the user owns the liquid ejecting apparatus 100_1, the first processing apparatus 200_1, and the head unit 110. On the other hand, although the user does not own the server 300, the user can communicate (connected to) with the server 300 through a communication network NW (described later).

The user refers to a person who uses the liquid ejecting apparatus 100_1. For example, when the manufacturer of the printer main body, who purchases the head from the head manufacturer and manufactures the printer main body, uses the printer main body, the manufacturer of the printer main body is the user. Further, for example, when the manufacturer of the printer main body purchases the head from the head manufacturer and manufactures the printer main body, and a third party purchases and uses the printer main body from the manufacturer of the printer main body, the third party is the user.

The liquid ejecting apparatuses 100_1 to 100_3 and the first processing apparatuses 200_1 to 200_3 have a one-to-one correspondence with each other. In addition, in FIG. 1, three liquid ejecting apparatuses 100_1 to 100_3 and three first processing apparatuses 200_1 to 200_3 are described, but the numbers thereof are exemplary, and the liquid ejecting system 10 has any number of sets of the liquid ejecting apparatus 100 and the first processing apparatus 200.

In the liquid ejecting system 10, the first processing apparatus 200 is communicably connected to each of the liquid ejecting apparatus 100 and the server 300 wirelessly or by wire. The first processing apparatus 200 is connected to the server 300 through a communication network NW including the Internet. A communication network including the Internet may intervene in the connection between the first processing apparatus 200 and the liquid ejecting apparatus 100.

Further, as shown in FIG. 1, output information D1 is transmitted from the liquid ejecting apparatus 100 to the first processing apparatus 200. Further, the output information D1 is transmitted from the first processing apparatus 200 to the server 300. Meanwhile, input information D2 is transmitted from the server 300 to the first processing apparatus 200. The details of the output information D1 and the input information D2 will be described later with reference to FIGS. 2 and 4.

1-2. Configuration of Liquid Ejecting Apparatus

Figure 2:
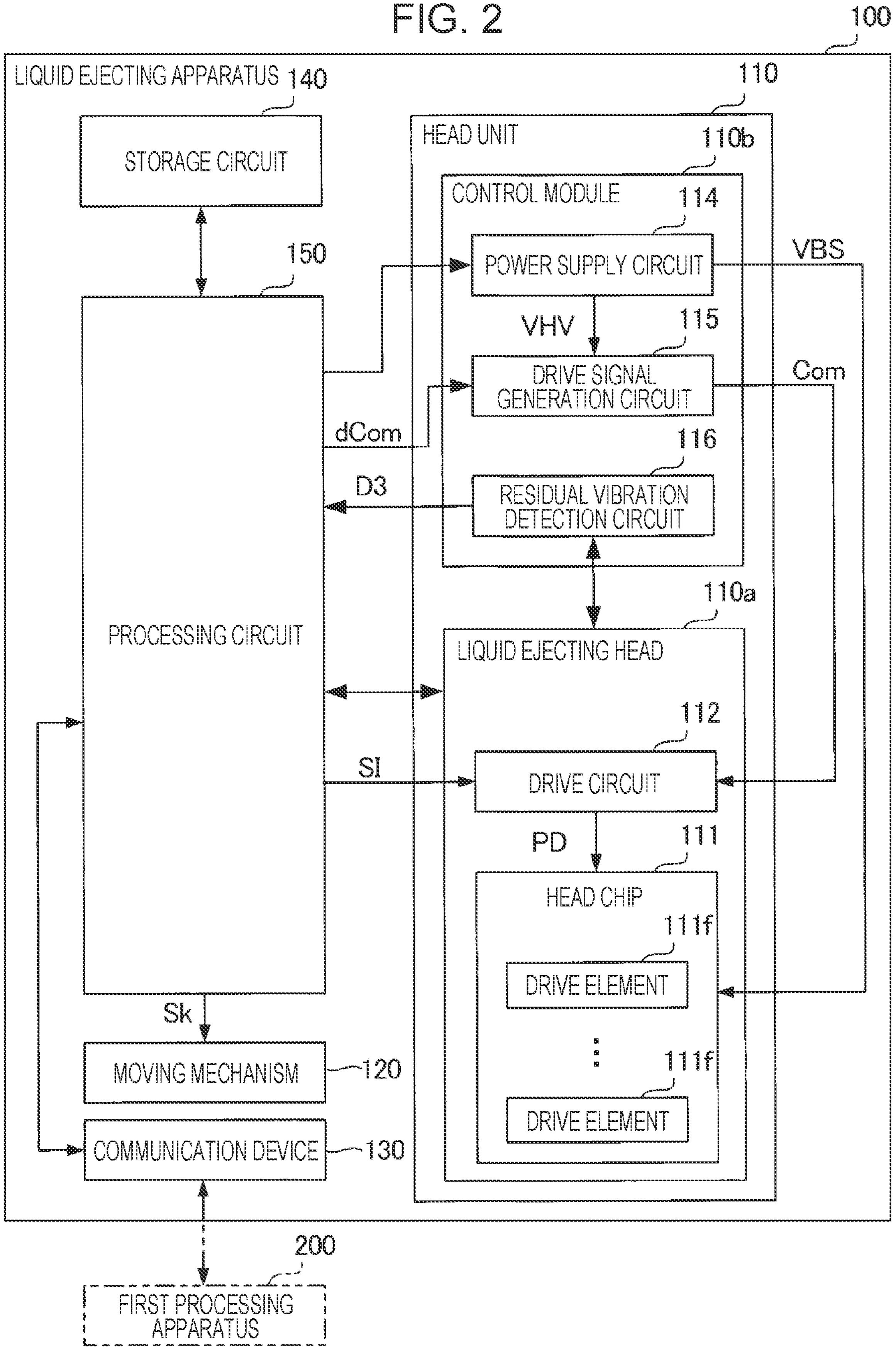
FIG. 2 is a schematic diagram showing a configuration example of a liquid ejecting apparatus used in the liquid ejecting system according to the first embodiment.

FIG. 2 is a schematic diagram showing a configuration example of the liquid ejecting apparatus 100 used in the liquid ejecting system 10 according to the first embodiment. The liquid ejecting apparatus 100 is a printer that performs printing on a print medium by an ink jet method. The print medium may be any medium as long as it can be printed by the liquid ejecting apparatus 100, and is not particularly limited, and is, for example, various papers, various cloths, various films, and the like. The liquid ejecting apparatus 100 may be a serial type printer or a line type printer.

As shown in FIG. 2, the liquid ejecting apparatus 100 includes the head unit 110, a moving mechanism 120, a communication device 130, a storage circuit 140, and a processing circuit 150.

The head unit 110 is an assembly including a head chip 111, a drive circuit 112, a power supply circuit 114, a drive signal generation circuit 115, and a residual vibration detection circuit 116.

In the example shown in FIG. 2, the head unit 110 is divided into a liquid ejecting head 110*a* including the head chip 111 and the drive circuit 112, and a control module 110*b* including the power supply circuit 114, the drive signal generation circuit 115, and residual vibration detection circuit 116. The head unit 110 is not limited to the aspect of being divided into the liquid ejecting head 110*a* and the control module 110*b*, and for example, a part or all of the control module 110*b* may be incorporated in the liquid ejecting head 110*a*.

The head chip 111 ejects ink toward the print medium. In FIG. 2, among the components of the head chip 111, a plurality of drive elements 111*f* are typically shown.

In the example shown in FIG. 2, the head unit 110 has one head chip 111 in number, but the number may be two or more. When the liquid ejecting apparatus 100 is a serial type, one or more head chips 111 are arranged so that a plurality of nozzles N are distributed over a part of the width direction of the print medium. Further, when the liquid ejecting apparatus 100 is a line type, two or more head chips 111 are arranged so that the plurality of nozzles N are distributed over the entire width direction of the print medium.

The drive circuit 112 performs switching under the control of the processing circuit 150 as to whether or not to supply the drive signal Com output from the drive signal generation circuit 115 to each of the plurality of drive elements 111*f* of the head chip 111 as the drive pulse PD. The drive circuit 112 includes, for example, a group of switches such as a transmission gate for the switching.

The power supply circuit 114 receives electric power from a commercial power source (not shown) and generates various predetermined potentials. The various potentials generated are appropriately supplied to each portion of the liquid ejecting apparatus 100. In the example shown in FIG. 2, the power supply circuit 114 generates a power supply potential VHV and an offset potential VBS. The offset potential VBS is supplied to the head chip 111 and the like.

Further, the power supply potential VHV is supplied to the drive signal generation circuit 115 and the like.

The drive signal generation circuit 115 is a circuit that generates a drive signal Com for driving each drive element 111*f* of the head chip 111. Specifically, the drive signal generation circuit 115 includes, for example, a digital-to-analog (DA) conversion circuit and an amplifier circuit. The drive signal generation circuit 115 generates the drive signal Com by the DA conversion circuit converting a waveform designation signal dCom described later from the processing circuit 150 from a digital signal to an analog signal, and the amplifier circuit amplifying the analog signal using the power supply potential VHV from the power supply circuit 114. Here, among the waveforms included in the drive signal Com, the signal of the waveform actually supplied to the drive element 111*f* is the drive pulse PD.

The residual vibration detection circuit 116 detects information regarding residual vibration after causing a pressure change in the ink in a pressure chamber C, which will be described later, by drive of the drive element 111*f*. The residual vibration detection circuit 116 acquires information regarding residual vibration, for example, based on a signal output by the piezoelectric effect from the drive element 111*f* due to the residual vibration. The method of generating residual vibration differs depending on the state in the nozzles N and the pressure chamber C, which will be described later, a viscosity of ink, and the like. More specifically, depending on the above-mentioned factors, the amplitude, period, attenuation rate, and the like of the waveform indicating the residual vibration vary. The information regarding the residual vibration detected by the residual vibration detection circuit 116 is output to the first processing apparatus 200 by the processing circuit 150 as residual vibration information D3. The residual vibration information D3 includes at least one of the amplitude, period, and attenuation rate of the waveform indicating the residual vibration described above. The residual vibration information D3 is an example of first information.

The moving mechanism 120 changes a relative position of the liquid ejecting head 110*a* and a print medium. More specifically, when the liquid ejecting apparatus 100 is a serial type, the moving mechanism 120 includes a transport mechanism for transporting the print medium in a predetermined direction and a moving mechanism for repeatedly moving the liquid ejecting head 110*a* along an axis orthogonal to the transport direction of the print medium. Further, when the liquid ejecting apparatus 100 is a line type, the moving mechanism 120 includes a transport mechanism for transporting the print medium in a direction intersecting a longitudinal direction of the elongated liquid ejecting head 110*a*.

The communication device 130 is a circuit that is communicably connected to the first processing apparatus 200. For example, the communication device 130 is an interface such as a wireless or wired local area network (LAN) or a universal serial bus (USB). USB is a registered trademark. The communication device 130 may be connected to another first processing apparatus 200 through another network such as the Internet. Further, the communication device 130 may be integrated with the processing circuit 150.

The storage circuit 140 stores various programs executed by the processing circuit 150 and various data, such as print data, processed by the processing circuit 150. The storage circuit 140 includes, for example, one or both semiconductor memories of one or more volatile memories such as a random-access memory (RAM) and one or more non-volatile memories such as a read-only memory (ROM), an electrically erasable programmable ROM (EEPROM), or a programmable ROM (PROM). The print data is supplied from, for example, the first processing apparatus 200. The storage circuit 140 may be built as a part of the processing circuit 150. The print data is an example of recorded data.

The processing circuit 150 has a function of controlling the operation of each portion of the liquid ejecting apparatus 100 and a function of processing various data. The processing circuit 150 includes, for example, one or more processors such as a central processing unit (CPU). The processing circuit 150 may include a programmable logic device such as a field-programmable gate array (FPGA) in place of the CPU or in addition to the CPU.

The processing circuit 150 controls the operation of each portion of the liquid ejecting apparatus 100 by executing a program stored in the storage circuit 140. Here, the processing circuit 150 generates signals such as a control signal Sk, a print data signal SI, and the waveform designation signal dCom as signals for controlling the operation of each portion of the liquid ejecting apparatus 100.

The control signal Sk is a signal for controlling the drive of the moving mechanism 120. The print data signal SI is a signal for controlling the drive of the drive circuit 112. Specifically, the print data signal SI specifies whether the drive circuit 112 supplies the drive signal Com from the drive signal generation circuit 115 to the liquid ejecting head 110*a* as the drive pulse PD, for each predetermined unit period. By the specification, the amount of ink ejected from the liquid ejecting head 110*a* and the like are specified. The waveform designation signal dCom is a digital signal for defining the waveform of the drive signal Com generated by the drive signal generation circuit 115.

Further, the processing circuit 150 outputs, to the first processing apparatus 200 through the communication device 130, the output information D1 including information on the number of times that the drive element 111*f* is driven by the drive signal Com, information on the drive waveform which is the waveform of the drive signal Com, and the like. The details of the output information D1 will be described later with reference to FIG. 4.

Figure 3:
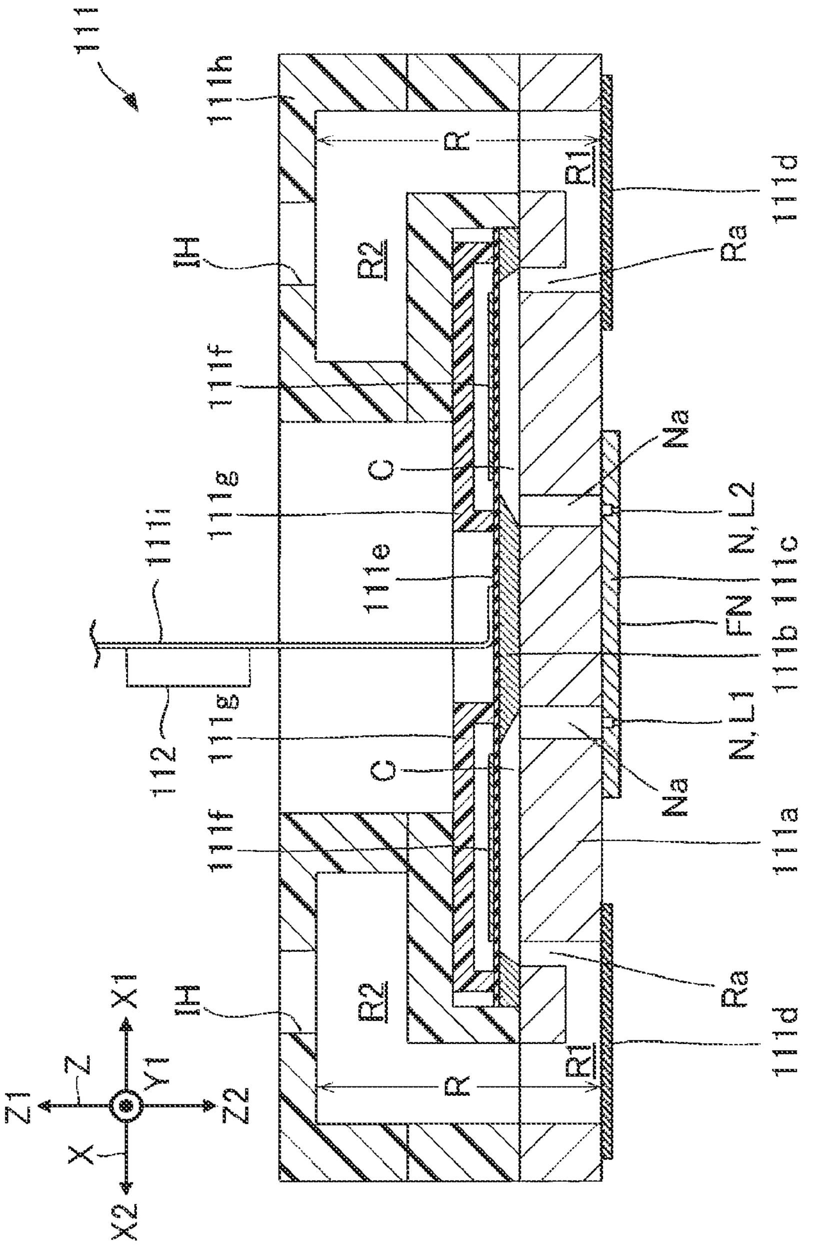
FIG. 3 is a cross-sectional view showing a configuration example of a head chip.

FIG. 3 is a cross-sectional view showing a configuration example of the head chip 111. In the following description, an X axis, a Y axis and a Z axis that intersect each other are appropriately used. In the following, one direction along the X axis is a X1 direction, and a direction opposite to the X1 direction is an X2 direction. Similarly, the directions opposite to each other along the Y axis are a Y1 direction and a Y2 direction. Opposite directions along the Z axis are a Z1 direction and a Z2 direction.

As shown in FIG. 3, the head chip 111 has a plurality of nozzles N arranged in a direction along the Y axis. The plurality of nozzles N are divided into a first row L1 and a second row L2 which are arranged at intervals in a direction along the X axis. Each of the first row L1 and the second row L2 is a set of a plurality of nozzles N linearly arranged in the direction along the Y axis.

The head chip 111 has a configuration substantially symmetrical with each other in the direction along the X axis. However, positions of the plurality of nozzles N in the first row L1 and the plurality of nozzles N in the second row L2 in the direction along the Y axis may match or differ from each other. FIG. 3 illustrates a configuration in which the positions of the plurality of nozzles N in the first row L1 and the plurality of nozzles N in the second row L2 in the direction along the Y axis match with each other.

As shown in FIG. 3, the head chip 111 includes a flow path substrates 111*a*, a pressure chamber substrate 111*b*, a nozzle plate 111$c$, vibration absorbing bodies 111$d$, a vibration plate 111$e$, a plurality of drive elements 111$f$, protective plates 111$g$, a case 111$h$, and a wiring substrate 111$i$.

The flow path substrate 111$a$ and the pressure chamber substrate 111$b$ are stacked in this order in the Z1 direction, and form a flow path for supplying ink to a plurality of nozzles N. The vibration plate 111$e$, the plurality of drive elements 111$f$, the protective plates 111$g$, the case 111$h$, and the wiring substrate 111$i$ are installed in a region located in the Z1 direction with respect to the stack body formed by the flow path substrate 111$a$ and the pressure chamber substrate 111$b$. On the other hand, the nozzle plate 111$c$ and the vibration absorbing bodies 111$d$ are installed in a region located in the Z2 direction with respect to the stack body. Each element of the head chip 111 is schematically a plate-shaped member elongated in the Y direction, and is joined to each other by, for example, an adhesive. Hereinafter, each element of the head chip 111 will be described in order.

The nozzle plate 111$c$ is a plate-shaped member provided with a plurality of nozzles N in each of the first row L1 and the second row L2. Each of the plurality of nozzles N is a through hole through which ink is passed. Here, the surface of the nozzle plate 111$c$ facing the Z2 direction is a nozzle surface FN. The nozzle plate 111$c$ is manufactured by processing a silicon single crystal substrate by a semiconductor manufacturing technique using a processing technique such as dry etching or wet etching, for example. However, other known methods and materials may be appropriately used for manufacturing the nozzle plate 111$c$. Further, the cross-sectional shape of the nozzle N is typically a circular shape, but the shape is not limited thereto, and may be a non-circular shape such as a polygon or an ellipse.

The flow path substrate 111$a$ is provided with a space R1, a plurality of supply flow paths Ra, and a plurality of communication flow paths Na for each of the first row L1 and the second row L2. The space R1 is an elongated opening extending in the direction along the Y axis in a plan view in the direction along the Z axis. Each of the supply flow path Ra and the communication flow path Na is a through hole formed for each nozzle N. Each supply flow path Ra communicates with the space R1.

The pressure chamber substrate 111$b$ is a plate-shaped member provided with a plurality of pressure chambers C referred to as cavities for each of the first row L1 and the second row L2. The plurality of pressure chambers C are arranged in the direction along the Y axis. Each pressure chamber C is an elongated space formed for each nozzle N and extending in the direction along the X axis in a plan view. Each of the flow path substrate 111$a$ and the pressure chamber substrate 111$b$ is manufactured by processing a silicon single crystal substrate by, for example, semiconductor manufacturing technique, in the same manner as the nozzle plate 111$c$ described above. However, other known methods and materials may be appropriately used for the manufacturing of each of the flow path substrate 111$a$ and the pressure chamber substrate 111$b$.

The pressure chamber C is a space located between the flow path substrate 111$a$ and the vibration plate 111$e$. For each of the first row L1 and the second row L2, a plurality of the pressure chambers C are arranged in a direction along the Y axis. Further, the pressure chamber C communicates with each of the communication flow path Na and the supply flow path Ra. Therefore, the pressure chamber C communicates with the nozzle N through the communication flow path Na and communicates with the space R1 through the supply flow path Ra.

The vibration plate 111$e$ is arranged on the surface of the pressure chamber substrate 111$b$ facing the Z1 direction. The vibration plate 111$e$ is a plate-shaped member that can elastically vibrate. The vibration plate 111$e$ has, for example, a first layer and a second layer, which are stacked in the Z1 direction in this order. The first layer is, for example, an elastic film made of silicon oxide ($SiO_2$). The elastic film is formed, for example, by thermally oxidizing one surface of a silicon single crystal substrate. The second layer is, for example, an insulating film made of zirconium oxide ($ZrO_2$). The insulating film is formed by, for example, forming a zirconium layer by a sputtering method and thermally oxidizing the layer. The vibration plate 111$e$ is not limited to the above-mentioned stacked configuration of the first layer and the second layer, and may be constituted by, for example, a single layer or three or more layers.

On the surface of the vibration plate 111$e$ facing the Z1 direction, a plurality of drive elements 111$f$ corresponding to the nozzles N are arranged for each of the first row L1 and the second row L2. Each drive element 111$f$ is a passive element that is deformed by the supply of the drive signal Com. Each drive element 111$f$ has an elongated shape extending in the direction along the X axis in a plan view. The plurality of drive elements 111$f$ are arranged in the direction along the Y axis to correspond to the plurality of pressure chambers C. The drive element 111$f$ overlaps the pressure chamber C in a plan view.

Each drive element 111$f$ is a piezoelectric element, and although not shown, it has a first electrode, a piezoelectric layer, and a second electrode, which are stacked in the Z1 direction in this order. One of the first electrode and the second electrode is an individual electrode arranged apart from other first electrodes for each drive element 111$f$, and a drive pulse PD is supplied to the one electrode. The other electrode of the first electrode and the second electrode is a band-shaped common electrode extending in the direction along the Y axis to be continuous over the plurality of drive elements 111$f$, and the offset potential VBS is supplied to the other electrode. Examples of the metal material of the electrodes include metal materials such as platinum (Pt), aluminum (Al), nickel (Ni), gold (Au), and copper (Cu), and of the materials, one type can be used alone or two or more types can be used in combination in an alloyed or stacked manner. The piezoelectric layer is made of a piezoelectric material such as lead zirconate titanate ($Pb(Zr, Ti) O_3$), and has, for example, a band shape extending in the direction along the Y axis be continuous over the plurality of drive elements 111$f$. However, the piezoelectric layer may be integrated over the plurality of drive elements 111$f$. In this case, the piezoelectric layer is provided with a through hole penetrating the piezoelectric layer extending in the direction along the X axis in a region corresponding to the gap between the pressure chambers C adjacent to each other in a plan view. When the vibration plate 111$e$ vibrates in conjunction with the above deformation of the drive elements 111$f$, the pressures in the pressure chambers C fluctuate, and ink is ejected from the nozzles N.

The protective plates 111$g$ are a plate-shaped members installed on the surface of the vibration plate 111$e$ facing the Z1 direction, and protect the plurality of drive elements 111$f$ and reinforce the mechanical strength of the vibration plate 111$e$. Here, the plurality of drive elements 111$f$ are accommodated between the protective plates 111$g$ and the vibration plate 111$e$. The protective plates 111$g$ are made of, for example, a resin material.

The case 111$h$ is a member for storing ink supplied to a plurality of pressure chambers C. The case 111$h$ is made of, for example, a resin material. The case 111*h* is provided with a space R2 for each of the first row L1 and the second row L2. The space R2 is a space communicating with the above-mentioned space R1 and functions as a reservoir R for storing ink supplied to a plurality of pressure chambers C together with the space R1. The case 111*h* is provided with an introduction port IH for supplying ink to each reservoir R. The ink in each reservoir R is supplied to the pressure chamber C through each supply flow path Ra.

The vibration absorbing body 111*d*, also referred to as a compliance substrate, is a flexible resin film constituting a wall surface of the reservoir R, and absorbs pressure fluctuations of ink in the reservoir R. The vibration absorbing body 111*d* may be a thin plate made of metal and having flexibility. The surface of the vibration absorbing body 111*d* facing the Z1 direction is joined to the flow path substrate 111*a* with an adhesive or the like.

The wiring substrate 111*i* is mounted on the surface of the vibration plate 111*e* facing the Z1 direction, and is a mounting component for electrically coupling a control unit 20 and the head chip 111. The wiring substrate 111*i* is a flexible wiring substrate such as a chip on film (COF), a flexible printed circuit (FPC) or a flexible flat cable (FFC). The drive circuit 112 described above is mounted on the wiring substrate 111*i* of the present embodiment.

In the head chip 111, when the vibration plate 111*e* or the drive element 111*f* deteriorates, when the type of ink supplied to a plurality of the pressure chambers C is changed, and so on, the waveform of the residual vibration in the vibration plate 111*e* is changed after the pressure is changed in the ink in the pressure chambers C. As an example, the liquid ejecting system 10 according to the present embodiment compares the amplitude of the waveform of the residual vibration with a threshold value, and detects an ejection failure of the ink based on a comparison result. Further, the liquid ejecting system 10 according to the present embodiment more accurately detects the ejection failure of the ink by correcting the threshold value as the vibration plate 111*e* and the drive element 111*f* deteriorate or the ink is replaced.

1-3. Configuration of First Processing Apparatus

Figure 4:
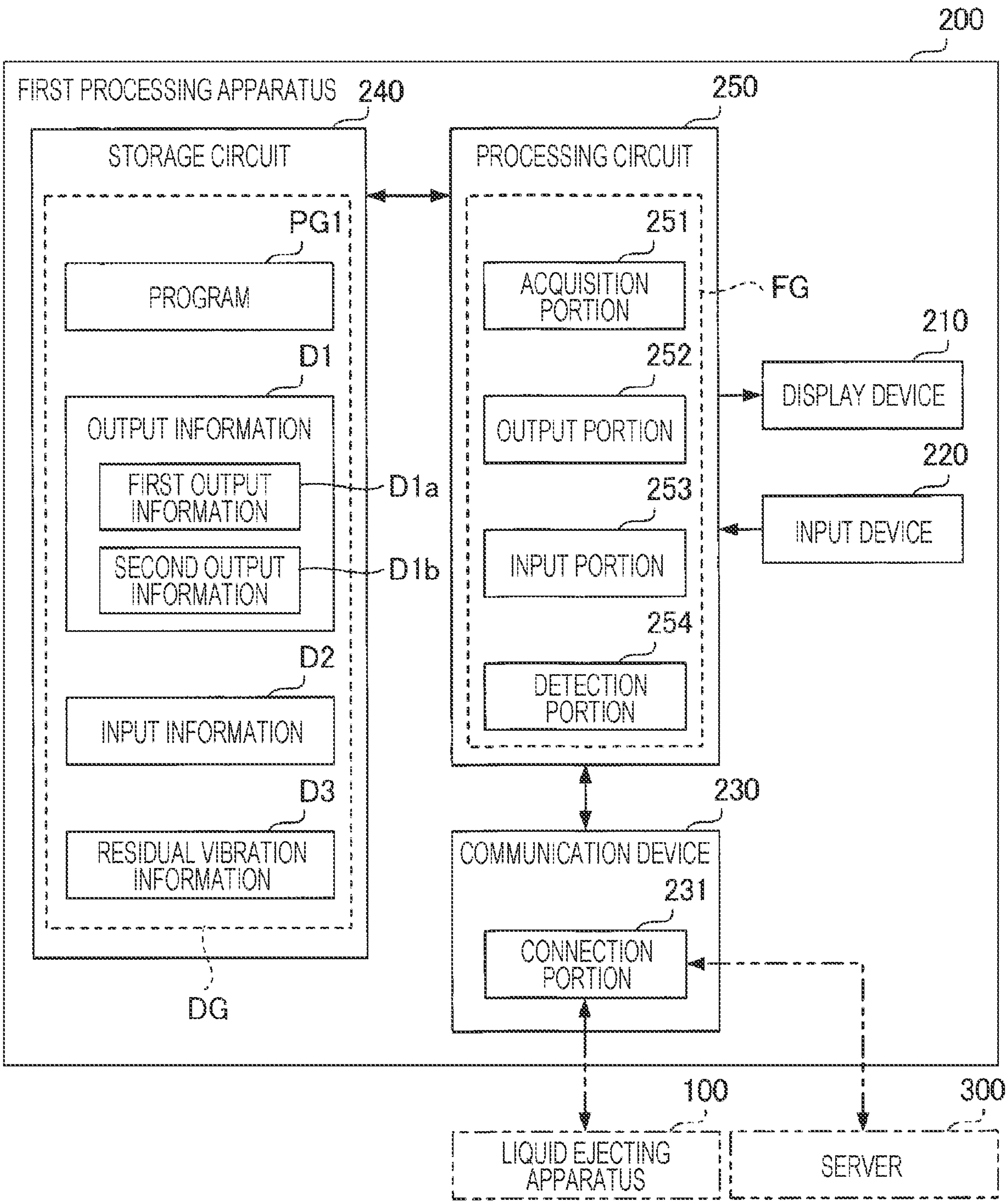
FIG. 4 is a schematic diagram showing a configuration example of a first processing apparatus used in the liquid ejecting system according to the first embodiment.

FIG. 4 is a schematic diagram showing a configuration example of the first processing apparatus 200 used in the liquid ejecting system 10 according to the first embodiment. The first processing apparatus 200 is a computer of a desktop type, a laptop type, or the like, and controls printing by the liquid ejecting apparatus 100.

As shown in FIG. 4, the first processing apparatus 200 includes a display device 210, an input device 220, a communication device 230, a storage circuit 240, and a processing circuit 250. The components are communicably connected to each other.

The display device 210 displays various images under the control of the processing circuit 250. Here, the display device 210 includes various display panels such as a liquid crystal display panel or an organic electro-luminescence (EL) display panel, for example. The display device 210 may be provided outside the first processing apparatus 200. Further, the display device 210 may be a component of the liquid ejecting apparatus 100.

The input device 220 is a device that receives operations from the user. For example, the input device 220 has a pointing device such as a touch pad, a touch panel or a mouse. Here, when the input device 220 has a touch panel, the input device 220 may also serve as a display device 210. The input device 220 may be provided outside the first processing apparatus 200. Further, the input device 220 may be a component of the liquid ejecting apparatus 100.

The communication device 230 is a circuit that is communicably connected to the liquid ejecting apparatus 100 and the server 300. For example, the communication device 230 is an interface such as a wireless or wired LAN or USB. The communication device 230 transmits print data to the liquid ejecting apparatus 100 and receives the residual vibration information D3 from the liquid ejecting apparatus 100, by communicating with the liquid ejecting apparatus 100. Further, the communication device 230 transmits the output information D1 and receives the input information D2 by communicating with the server 300. That is, the communication device 230 functions as a connection portion 231 communicably connected to the liquid ejecting apparatus 100 and the server 300. The communication device 230 may be integrated with the processing circuit 250. Further, the connection portion 231 is an example of a network connection portion.

The output information D1 is an output parameter regarding the degree of deterioration of the drive element 111*f*. Specifically, the output information D1 includes, for example, first output information D1*a* regarding the number of times that the drive element 111*f* is driven. Further, the output information D1 includes, for example, second output information D1*b* regarding the drive waveform for driving the drive element 111*f*. Here, the second output information D1*b* regarding the drive waveform includes, for example, one or more of the amplitude of the drive waveform, a period of the drive waveform, an attenuation rate of the drive waveform, and the like.

The first output information D1*a* is an example of a first output parameter. The second output information D1*b* is an example of a second output parameter. The output information D1 is not limited to the first output information D1*a* and the second output information D1*b*, and may include other information.

The input information D2 is an input parameter for detecting an ejection failure of the drive element 111*f* based on the residual vibration of a vibration plate 111*e*. As will be described later, when a detection portion 254 compares, for example, a potential indicating the amplitude of residual vibration with a threshold value, the input information D2 includes a first input parameter regarding the threshold value. As will be described later, the first input parameter is a value calculated by the server 300. The server 300 calculates the first input parameter so that the threshold value becomes smaller as the degree of deterioration of the drive element 111*f* becomes larger. The first input parameter may be the correction value of the threshold value itself.

The storage circuit 240 is a device that stores various programs executed by the processing circuit 250 and various data processed by the processing circuit 250. The storage circuit 240 has, for example, a hard disk drive or a semiconductor memory. A part or all of the storage circuit 240 may be provided in a storage device or a server outside the first processing apparatus 200.

The program PG1, the output information D1, the input information D2, and the residual vibration information D3 are stored in the storage circuit 240 of the present embodiment. Some or all of the program PG1, the output information D1, the input information D2, and the residual vibration information D3 may be stored in a storage device or server outside the first processing apparatus 200. Further, the programs PG1, the output information D1, the input information D2 and the residual vibration information D3 are collectively referred to as a "data set DG" in the present specification.

The processing circuit 250 is a device having a function of controlling each portion of the first processing apparatus 200, the liquid ejecting apparatus 100 and the server 300, and a function of processing various data. The processing circuit 250 has a processor such as a CPU. The processing circuit 250 may be constituted by a single processor or may be constituted by a plurality of processors. In addition, some or all of the functions of the processing circuit 250 are implemented by hardware such as a digital signal processor (DSP), an application specific integrated circuit (ASIC), a programmable logic device (PLD), a field programmable gate array (FPGA).

The processing circuit 250 functions as an acquisition portion 251, an output portion 252, an input portion 253, and the detection portion 254 by reading the program PG1 from the storage circuit 240 and executing the program PG1.

The acquisition portion 251 acquires the output information D1 and the residual vibration information D3 by communicating with the liquid ejecting apparatus 100 using the connection portion 231. The acquisition portion 251 stores the acquired output information D1 and residual vibration information D3 in the storage circuit 240.

The output portion 252 outputs the acquired output information D1 to the server 300 through the connection portion 231.

As an example, the output portion 252 may immediately output the output information D1 to the server 300 when the user of the liquid ejecting apparatus 100 gives an output instruction using the input device 220.

The input portion 253 inputs the input information D2 from the server 300 through the connection portion 231. Further, the input portion 253 stores the input information D2 in the storage circuit 240.

The detection portion 254 detects an ejection failure in the liquid ejecting apparatus 100 based on the input information D2 and the residual vibration information D3. As an example, the detection portion 254 detects the ejection failure in the liquid ejecting apparatus 100 based on the comparison result between the potential indicating the amplitude of the residual vibration as the residual vibration information D3 and the threshold value as the input information D2.

For example, the detection portion 254 calculates the attenuation rate of the residual vibration based on an amplitude of residual vibration in a first period of a period for detecting the ejection failure and an amplitude of residual vibration in a second period after the first period. Further, the detection portion 254 estimates a viscosity of ink in the pressure chamber C based on the attenuation rate of the residual vibration. Then, the detection portion 254 can detect an ejection failure in the liquid ejecting apparatus 100 based on the estimated viscosity of ink. In determining whether or not the degree of ejection failure is within a permissible range when the ejection failure is detected, the detection portion 254 compares the above-mentioned amplitude, attenuation rate, the period of residual vibration, or phase of residual vibration with threshold values.

The acquisition portion 251, the output portion 252, the input portion 253, and the detection portion 254 are collectively referred to as a "functional portion FG" in the present specification.

1-4. Configuration of Server

Figure 5:
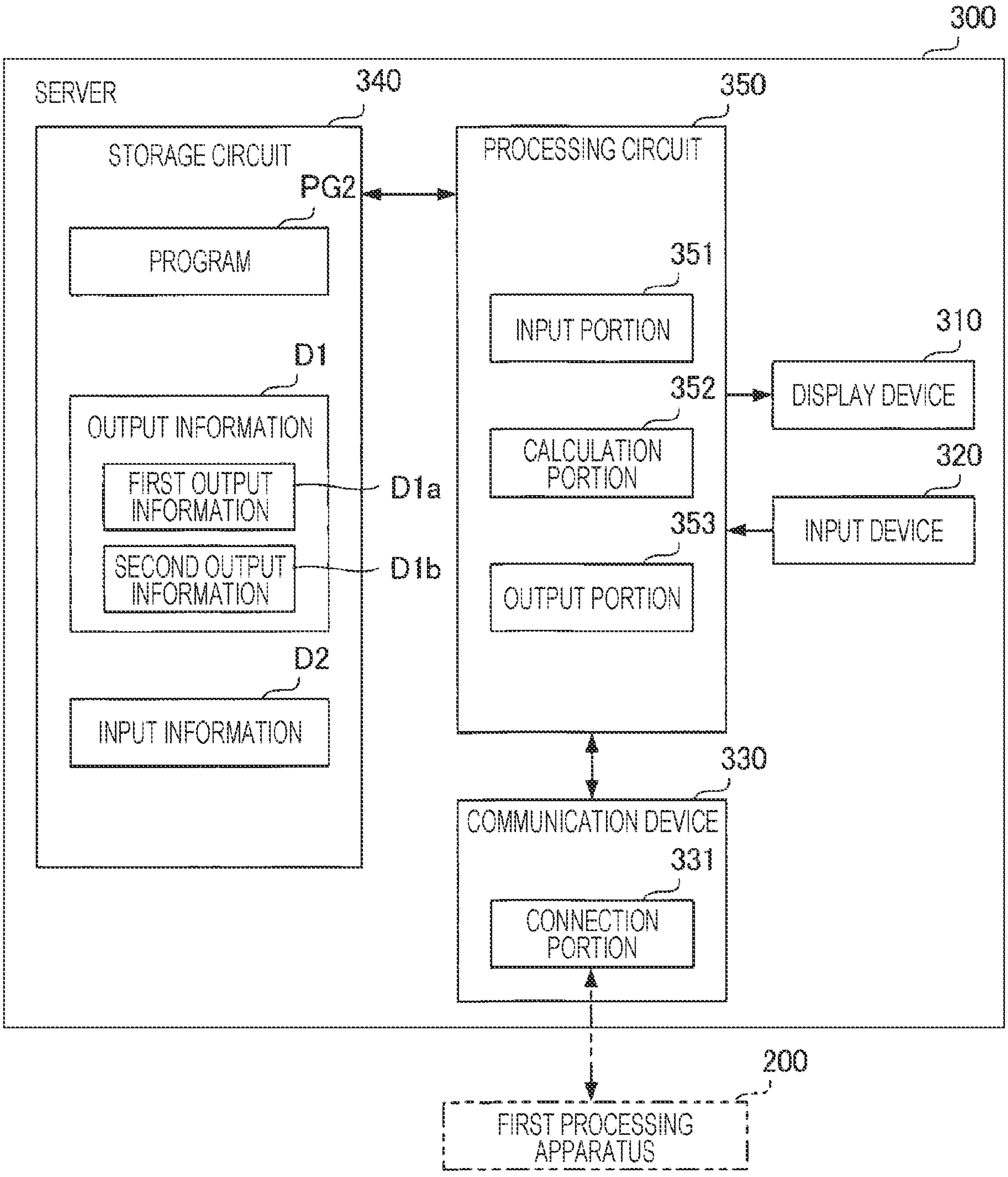
FIG. 5 is a schematic diagram showing a configuration example of a server used in the liquid ejecting system according to the first embodiment.

FIG. 5 is a schematic diagram showing a configuration example of the server 300 used in the liquid ejecting system 10 according to the first embodiment. The server 300 is, for example, a cloud server, and is a computer that generates the input information D2 based on the output information D1. The server 300 is not limited to the cloud server. For example, the server 300 may be a virtual server such as a virtual private server (VPS). Alternatively, the server 300 may be operated on-premises.

As shown in FIG. 5, the server 300 includes a display device 310, an input device 320, a communication device 330, a storage circuit 340, and a processing circuit 350. The components are communicably connected to each other.

The display device 310 is a device that displays various images under the control of the processing circuit 350, and is configured in the same manner as the display device 210 described above.

The input device 320 is a device that receives an operation from the user, and is configured in the same manner as the input device 220 described above.

The communication device 330 is a circuit that is communicably connected to each first processing apparatus 200, and is configured in the same manner as the communication device 230 as described above. That is, the communication device 330 functions as a connection portion 331 that is communicably connected to each first processing apparatus 200. The communication device 330 may be integrated with the processing circuit 350.

The storage circuit 340 is a device that stores various programs executed by the processing circuit 350 and various data processed by the processing circuit 350, and is configured in the same manner as the storage circuit 240 described above. A program PG2, the output information D1, and the input information D2 are stored in the storage circuit 340.

The processing circuit 350 is a device having a function of controlling each portion of the server 300 and a function of processing various data, and is configured in the same manner as the processing circuit 250 described above. The processing circuit 350 functions as an input portion 351, a calculation portion 352, and an output portion 353 by reading the program PG2 from the storage circuit 340 and executing the program PG2.

The input portion 351 allows the output information D1 to be input from the first processing apparatus 200 through the connection portion 331. Further, the input portion 351 stores the output information D1 in the storage circuit 340. When the output information D1 is transmitted from the first processing apparatus 200, the input portion 351 allows the output information D1 to be input immediately. However, the input method of the output information D1 is not limited thereto. For example, when the output information D1 is transmitted from the first processing apparatus 200, the server 300 notifies the first processing apparatus 200 that the output information D1 is transmitted. The first processing apparatus 200 displays, on the display device 210, a message requesting the user of the liquid ejecting apparatus 100 to permit the server 300 to input the output information D1. The user of the liquid ejecting apparatus 100 checks the message, and then gives an instruction to permit the input of the output information D1 by the server 300 using the input device 220. When the server 300 acquires a signal indicating the permission, the input portion 351 inputs the output information D1 through the connection portion 331. An input method for the output information D1 may be the above method.

The calculation portion 352 calculates the input information D2 based on the output information D1. More specifically, the calculation portion 352 estimates the degree of deterioration of the drive element 111*f*, for example, by multiplying the number of times that the drive element 111*f* is driven, which is indicated by the first output information D1*a*, by a voltage indicated by the second output information D1*b*. Then, the calculation portion 352 calculates, for example, the first input parameter regarding the threshold value to be compared with the potential indicating the amplitude of the residual vibration in the first processing apparatus 200, according to the degree of deterioration of the drive element 111*f*. In the example, the first input parameter is set so that the threshold value becomes smaller as the deterioration of the drive element 111*f* becomes larger. The first input parameter is, for example, a correction amount of the threshold value.

Figure 6:
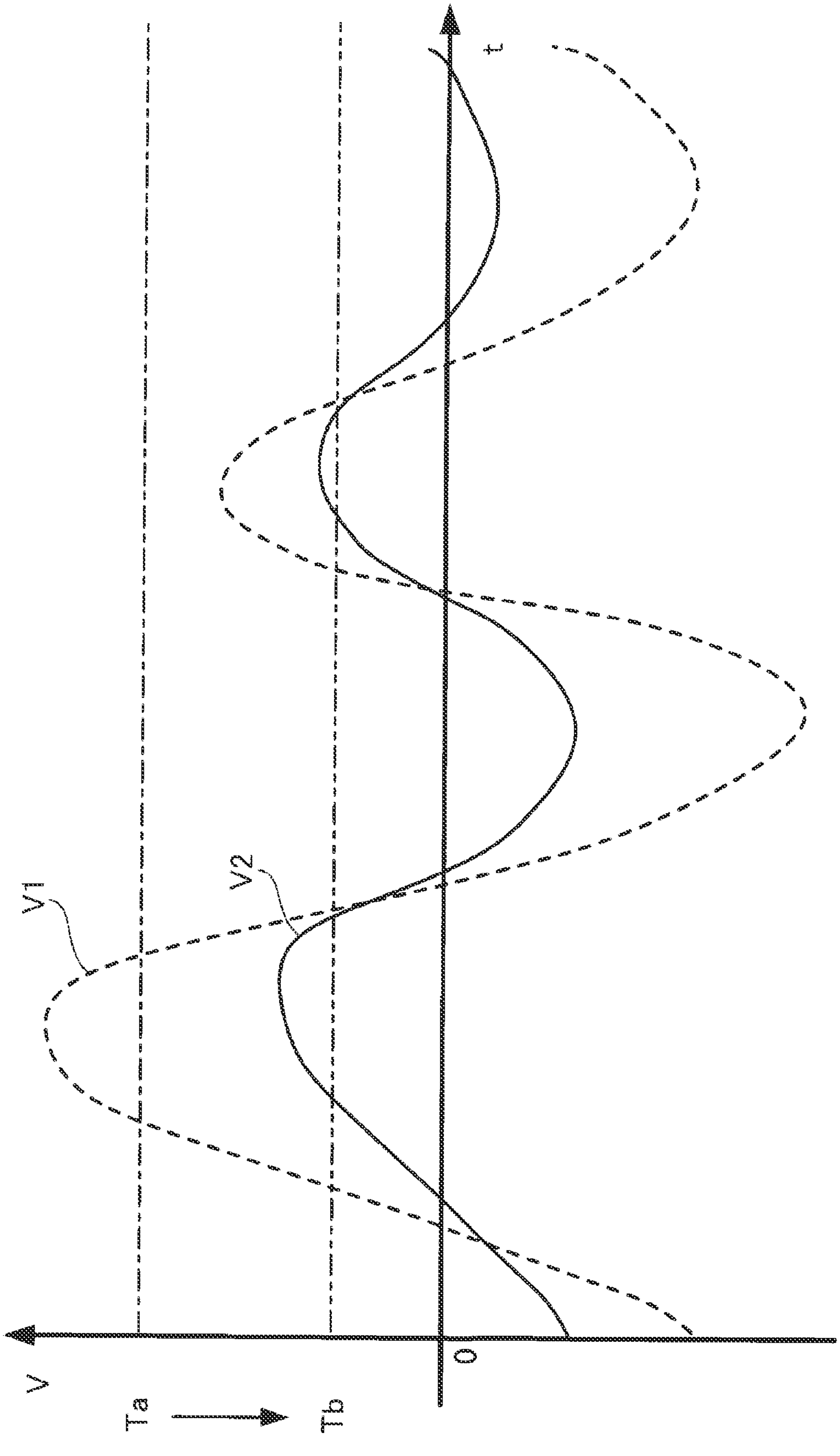
FIG. 6 is a graph showing a correspondence relationship between an amplitude of residual vibration and a threshold value.

FIG. 6 is a graph showing a correspondence relationship between the amplitude of the residual vibration and the threshold value. In FIG. 6, a vibration curve at a stage where the drive element 111*f* does not deteriorate is shown by V1, and a vibration curve after the deterioration is shown by V2. Further, the threshold value at the stage where the drive element 111*f* does not deteriorate is set to Ta. At the stage where the drive element 111*f* does not deteriorate, the detection portion 254 detects an ejection failure in the liquid ejecting apparatus 100 by comparing the amplitude in the vibration curve V1 with the threshold value Ta. However, when the vibration curve changes from V1 to V2 with the deterioration of the drive element 111*f*, the vibration curve V2 always falls below the threshold value Ta, and the detection portion 254 cannot accurately detect the ejection failure in the liquid ejecting apparatus 100 when the threshold value Ta is used. Therefore, the calculation portion 352 calculates the first input parameter so that the threshold value Ta changes to the threshold value Tb with the deterioration of the drive element 111*f*. By comparing the amplitude in the vibration curve V2 with the threshold value Tb, the detection portion 254 can more accurately detect the ejection failure in the liquid ejecting apparatus 100 after the drive element 111*f* deteriorates.

Referring back to FIG. 5, the output portion 353 outputs the input information D2 to the first processing apparatus 200 through the connection portion 331. The output portion 353 outputs the input information D2 to the first processing apparatus 200 as soon as the input information D2 is generated. However, the method of outputting the input information D2 is not limited thereto. For example, the output portion 353 notifies the first processing apparatus 200 that the input information D2 is generated. Based on the notification, the first processing apparatus 200 displays, on the display device 210, a message for checking whether or not the input information D2 is received. The user of the liquid ejecting apparatus 100 checks the message, and then gives an instruction to permit the output of the input information D2 by using the input device 220. When the server 300 acquires the signal indicating the permission, the output portion 353 outputs the input information D2 to the first processing apparatus 200. The method of transmitting the input information D2 may be the above method.

1-5. Process of Liquid Ejecting System

Figure 7:
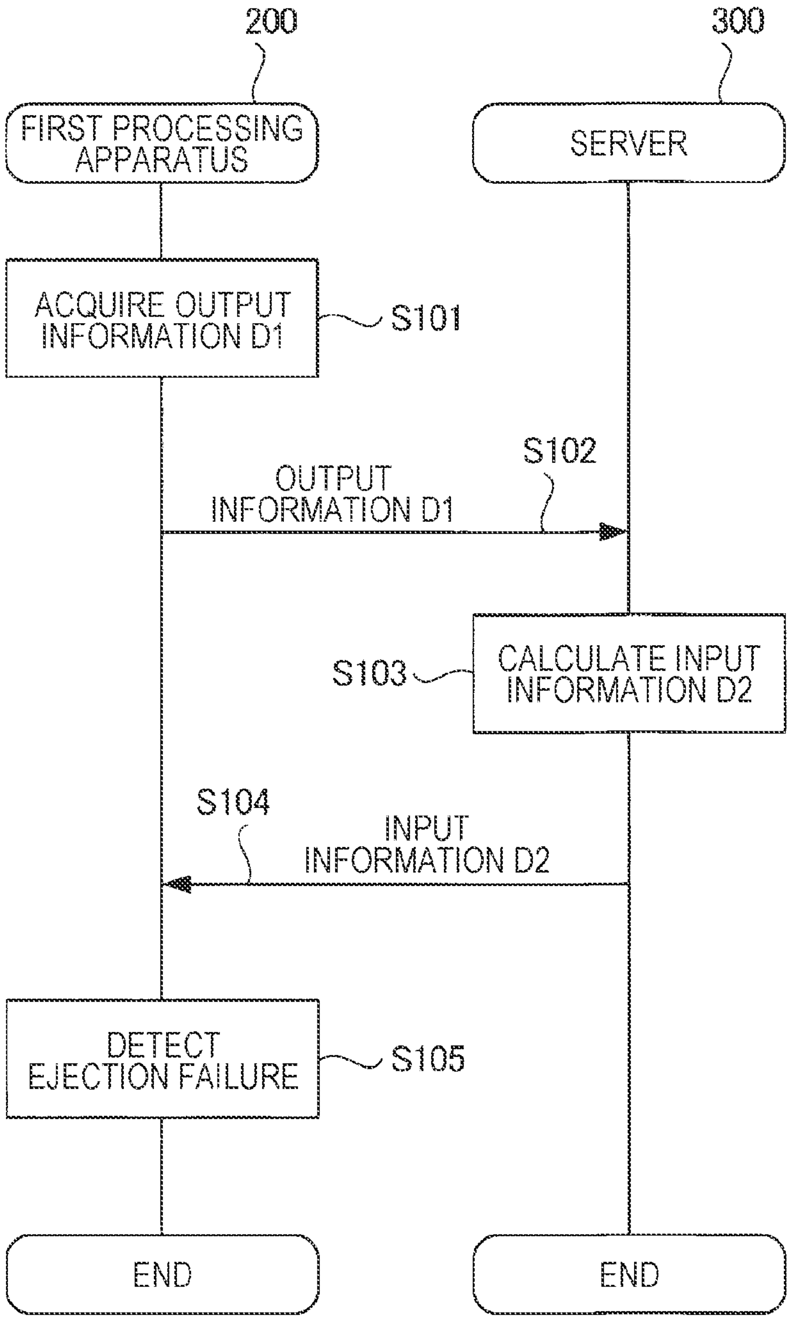
FIG. 7 is a flowchart showing a process of the liquid ejecting system according to a first embodiment.

FIG. 7 is a flowchart showing a process of the liquid ejecting system 10 according to the first embodiment.

In step S101, the processing circuit 250 of the first processing apparatus 200 acquires the output information D1 by functioning as the acquisition portion 251.

In step S102, the processing circuit 250 of the first processing apparatus 200 outputs the output information D1 to the server 300 by functioning as the output portion 252. Further, the processing circuit 350 of the server 300 inputs the output information D1 by functioning as the input portion 351.

In step S103, the processing circuit 350 of the server 300 calculates the input information D2 by functioning as the calculation portion 352.

In step S104, the processing circuit 350 of the server 300 outputs the input information D2 to the first processing apparatus 200 by functioning as the output portion 353. Then, the processing circuit 350 of the server 300 ends the entire process. Further, the processing circuit 250 of the first processing apparatus 200 inputs the input information D2 by functioning as the input portion 253.

In step S105, the processing circuit 250 of the first processing apparatus 200 detects the ejection failure in the liquid ejecting apparatus 100 based on the input information D2 and the residual vibration information D3, by functioning as the detection portion 254. Then, the processing circuit 250 of the first processing apparatus 200 ends the entire process.

After step S105, the processing circuit 250 of the first processing apparatus 200 may display the detection result of the ejection failure in the liquid ejecting apparatus 100 on the display device 210.

1-6. Effect of Liquid Ejecting System

The liquid ejecting system 10 according to the present embodiment includes the head unit 110 including the pressure chamber C, the drive element 111*f* driven by the applied drive waveform, the vibration plate 111*e* that vibrates by drive of the drive element 111*f*, and nozzles N through which a liquid is ejected by a pressure applied in the pressure chamber C by vibration of the vibration plate 111*e*. Further, the liquid ejecting system 10 includes the input portion 253 in which the input parameter for detecting an ejection failure of a liquid based on the residual vibration of the vibration plate 111*e* is input from the server 300 through the connection portion 231.

With the liquid ejecting system 10 having the above-mentioned configuration, the user of the printer as the liquid ejecting apparatus 100 can detect the ejection failure of the liquid in the liquid ejecting apparatus 100. In particular, by the function of inputting input parameters from the server 300, the first processing apparatus 200 can detect the ejection failure of the liquid. As an example, even if the drive element 111*f* provided in the liquid ejecting apparatus 100 deteriorates, it is possible to detect the ejection failure of the liquid by adjusting the input parameter from the server 300 with the deterioration. The function of inputting input parameters from the server 300 can be set by, for example, the manufacturer of the head. Further, not only when the drive element 111*f* is deteriorated, but also when, for example, in a printer as a liquid ejecting apparatus 100, the type of ink supplied to a plurality of pressure chambers C is changed, it is also possible to deal with the case of detecting the ejection failure of the ink.

Further, the liquid ejecting system 10 further includes the acquisition portion 251 that acquires the residual vibration information D3 regarding the residual vibration of the vibration plate 111*e*, and the detection portion 254 that detects the ejection failure based on the potential indicating the amplitude of the residual vibration indicated by the residual vibration information D3 and the input parameter.

With the liquid ejecting system 10 having the above-mentioned configuration, it is possible to detect the ejection failure of the ink by using the information regarding the residual vibration.

Further, the input parameter includes the first input parameter regarding the threshold value to be compared with the potential indicating the amplitude of the residual vibration.

With the liquid ejecting system 10 having the above-mentioned configuration, it is possible to detect the ejection failure of the ink based on the comparison between the potential indicating the amplitude of residual vibration and the threshold value.

Further, the first input parameter is set so that the threshold value becomes smaller as the deterioration of the drive element 111*f* becomes larger.

With the liquid ejecting system 10 having the above-mentioned configuration, it is possible to more accurately detect the ejection failure of the ink even if the drive element 111*f* deteriorates.

Further, the liquid ejecting system 10 further includes the output portion 252 that outputs the output parameter regarding the degree of deterioration of the drive element 111*f* to the server 300 through the network connection portion.

With the liquid ejecting system 10 having the above-mentioned configuration, it is possible for the server 300 to grasp the degree of deterioration of the drive element 111*f*.

Further, the output parameter includes the first output parameter regarding the number of times that the drive element 111*f* is driven.

With the liquid ejecting system 10 having the above-mentioned configuration, it is possible for the server 300 to grasp the degree of deterioration of the drive element 111*f* based on the number of times that the drive element 111*f* is driven.

Further, the output parameter further includes the second output parameter regarding the drive waveform.

With the liquid ejecting system 10 including the above-mentioned configuration, it is possible for the server 300 to grasp the degree of deterioration of the drive element 111*f* based on the drive waveform of the drive element 111*f*.

Further, the liquid ejecting system 10 includes the liquid ejecting apparatus 100 provided with the head unit 110, the first processing apparatus 200 that is provided with the display device 210 connected to the liquid ejecting apparatus 100 and displays information about the liquid ejecting apparatus 100, and the server 300.

With the liquid ejecting system 10 having the above-mentioned configuration, it is possible for the first processing apparatus 200 to control the liquid ejecting apparatus 100, and to transmit the information for detecting information about the liquid ejecting apparatus 100 from the server 300 to the first processing apparatus 200.

Further, the input portion 253 and the connection portion 231 are provided in the first processing apparatus 200.

With the liquid ejecting system 10 having the above-mentioned configuration, it is possible to input the input parameter from the server 300 to the first processing apparatus 200.

2. SECOND EMBODIMENT

Hereinafter, a second embodiment of the present disclosure will be described. In the embodiment illustrated below, elements whose actions or functions are similar to those of the first embodiment will be denoted by the same reference numerals used in the description of the first embodiment and detailed description thereof will be omitted as appropriate.

2-1. Outline of Liquid Ejecting System

Figure 8:
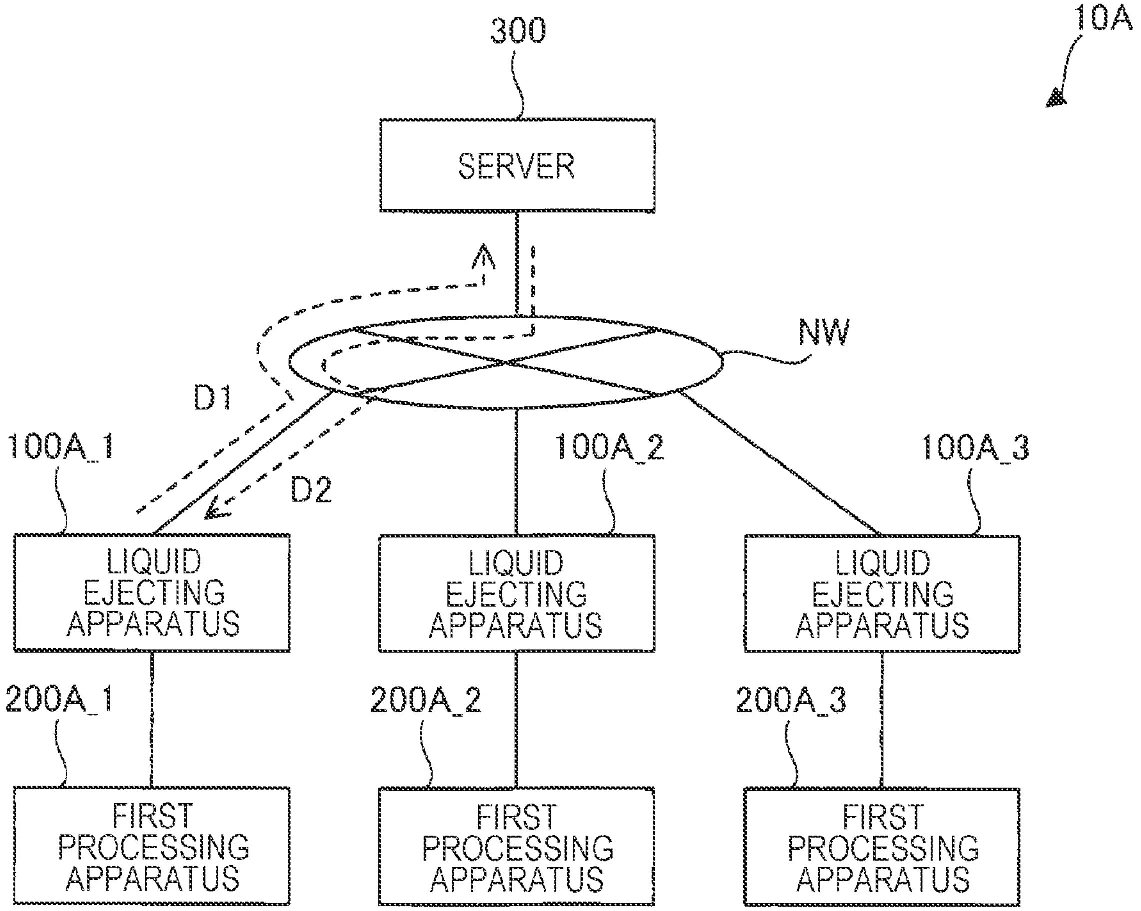
FIG. 8 is a schematic diagram showing a configuration example of a liquid ejecting system according to a second embodiment.

FIG. 8 is a schematic diagram showing a configuration example of a liquid ejecting system 10A according to the second embodiment. In the example shown in FIG. 8, the liquid ejecting system 10A includes liquid ejecting apparatuses 100A 1 to 100A 3, first processing apparatuses 200A 1 to 200A 3, and the server 300. In the following, the liquid ejecting apparatuses 100A 1 to 100A 3 are collectively referred to as a "liquid ejecting apparatus 100A". Similarly, the first processing apparatuses 200A 1 to 200A 3 are collectively referred to as a "first processing apparatus 200A".

The liquid ejecting apparatuses 100A 1 to 100A 3 and the first processing apparatuses 200A 1 to 200A 3 have a one-to-one correspondence with each other. In addition, in FIG. 8, three liquid ejecting apparatuses 100A 1 to 100A 3 and three first processing apparatuses 200A 1 to 200A 3 are described, but the numbers thereof are exemplary, and the liquid ejecting system 10A has any number of sets of the liquid ejecting apparatus 100A and the first processing apparatus 200A.

In the liquid ejecting system 10A, the liquid ejecting apparatus 100A is communicably connected to each of the first processing apparatus 200A and the server 300 wirelessly or by wire. A communication network NW including the Internet may intervene in the connection.

Further, as shown in FIG. 8, output information D1 is transmitted from the liquid ejecting apparatus 100A to the server 300. Meanwhile, input information D2 is transmitted from the server 300 to the liquid ejecting apparatus 100A.

2-2. Configuration of Liquid Ejecting Apparatus

Figure 9:
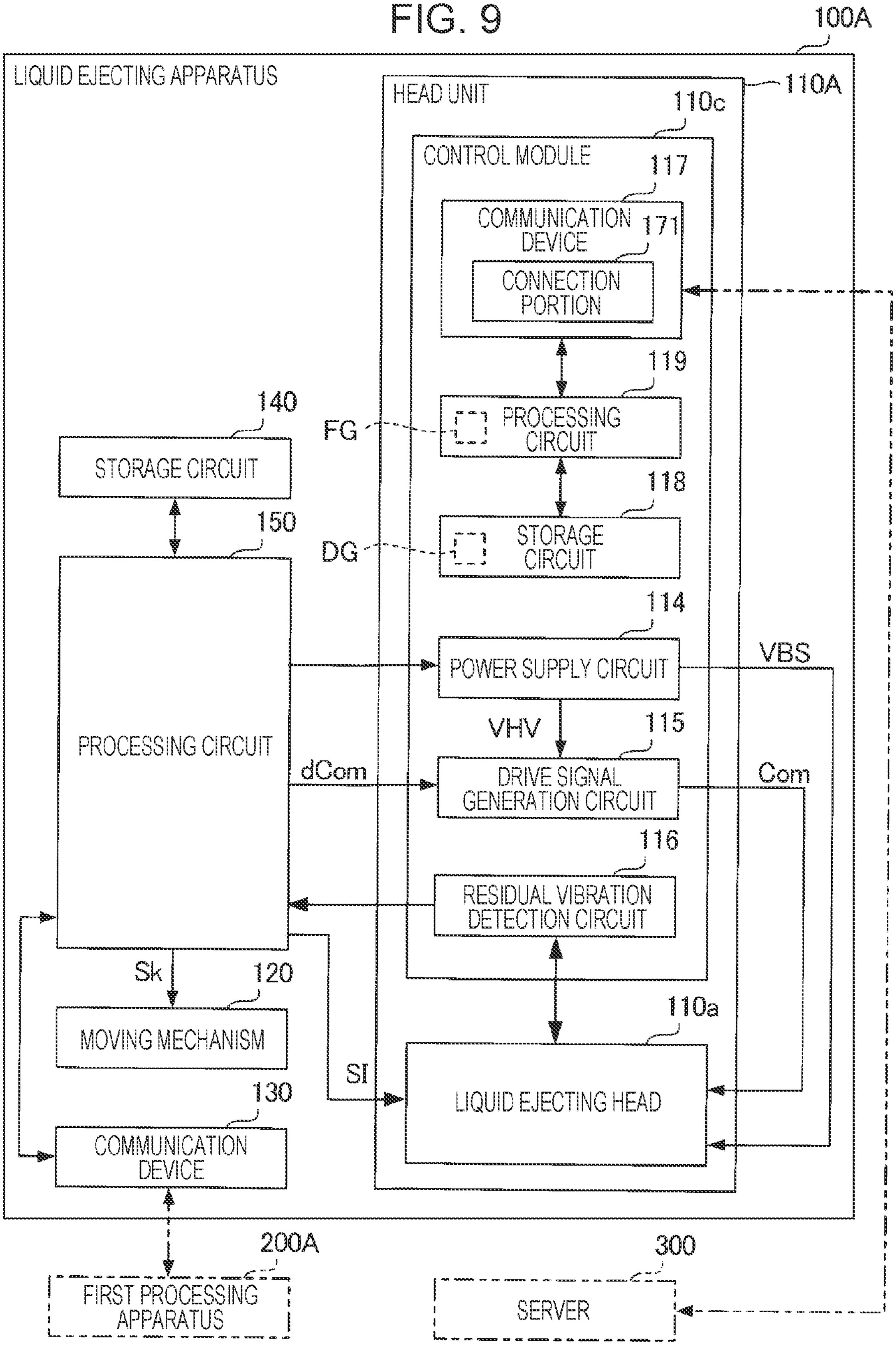
FIG. 9 is a schematic diagram showing a configuration example of a liquid ejecting apparatus used in the liquid ejecting system according to the second embodiment.

FIG. 9 is a schematic diagram showing a configuration example of the liquid ejecting apparatus 100A used in the liquid ejecting system 10A according to the second embodiment. The liquid ejecting apparatus 100A is different from the liquid ejecting apparatus 100 according to the first embodiment in that it has a control module 110*c* instead of the control module 110*b*. The control module 110*c* differs in that it has a communication device 117, a storage circuit 118, and a processing circuit 119 in addition to the components of the control module 110*b*.

The communication device 117 is a circuit that is communicably connected to the server 300. For example, the communication device 117 is an interface such as a wireless or wired LAN or USB. Further, the communication device 117 transmits the output information D1 and receives the input information D2 by communicating with the server 300. That is, the communication device 117 functions as a connection portion 171 that is communicably connected to the server 300. The communication device 117 may be integrated with the processing circuit 119. Further, the connection portion 171 is an example of a network connection portion.

In the storage circuit 118 of the present embodiment, data set DG is stored in the same manner as the storage circuit 240 of the first processing apparatus 200 according to the first embodiment. A part or all of the data set DG may be stored in an external storage device or server of the liquid ejecting apparatus 100A.

The processing circuit 119 operates as the functional portion FG by reading the program PG1 from the storage circuit 118 and executing the program PG1, in the same manner as the processing circuit 250 of the first processing apparatus 200 according to the first embodiment.

2-3. Configuration of First Processing Apparatus

Figure 10:
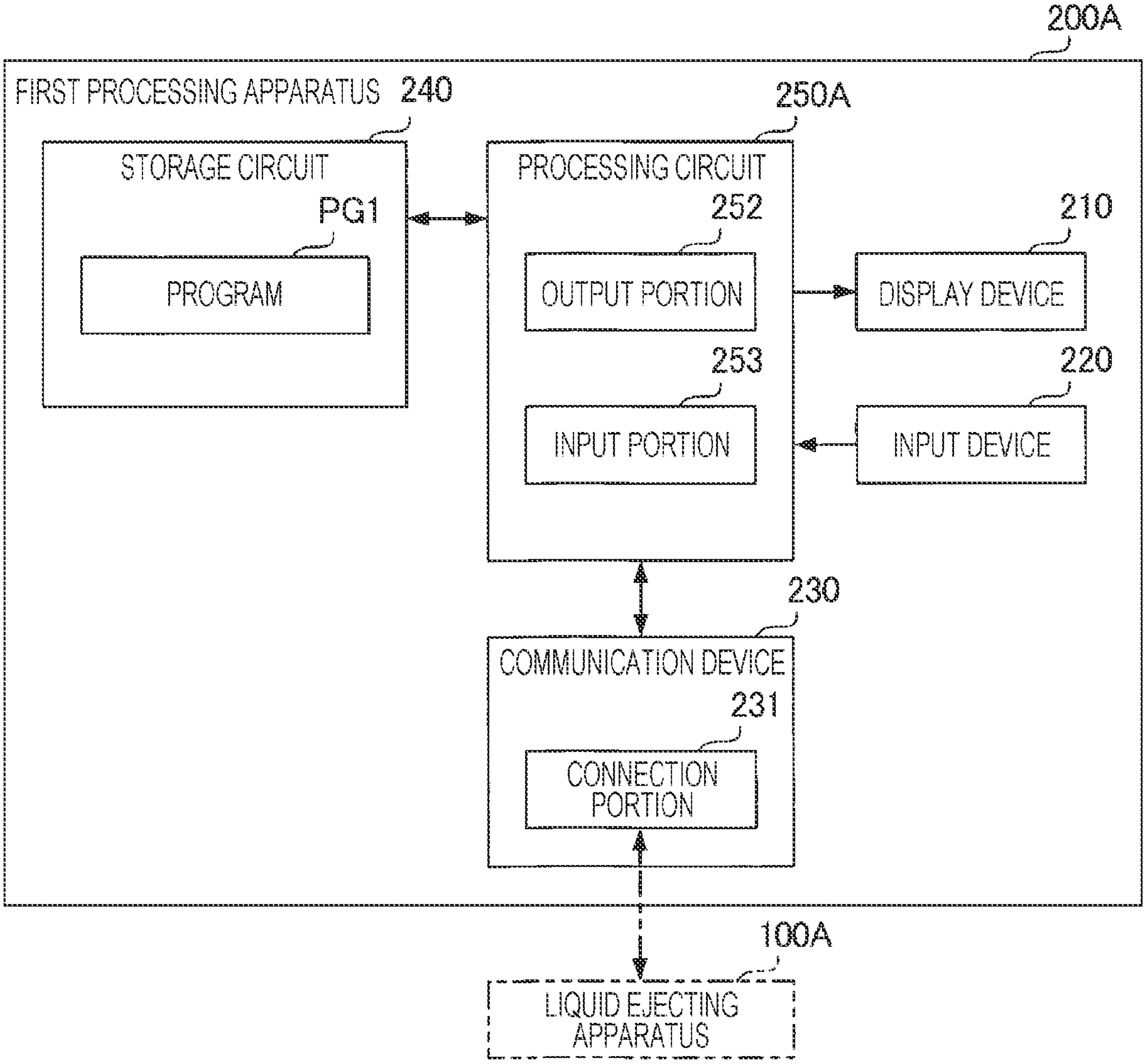
FIG. 10 is a schematic diagram showing a configuration example of a first processing apparatus used in the liquid ejecting system according to the second embodiment.

FIG. 10 is a schematic diagram showing a configuration example of the first processing apparatus 200A used in the liquid ejecting system 10A according to the second embodiment. The first processing apparatus 200A differs from the first processing apparatus 200 according to the first embodiment in that the storage of the output information D1, the input information D2, and the residual vibration information D3 by the storage circuit 240 is not essential, and in that the processing circuit 250A is included instead of the processing circuit 250.

The processing circuit 250A differs from the processing circuit 250 according to the first embodiment in that the acquisition portion 251 and the detection portion 254 are not essential components.

2-4. Process of Liquid Ejecting System

Figure 11:
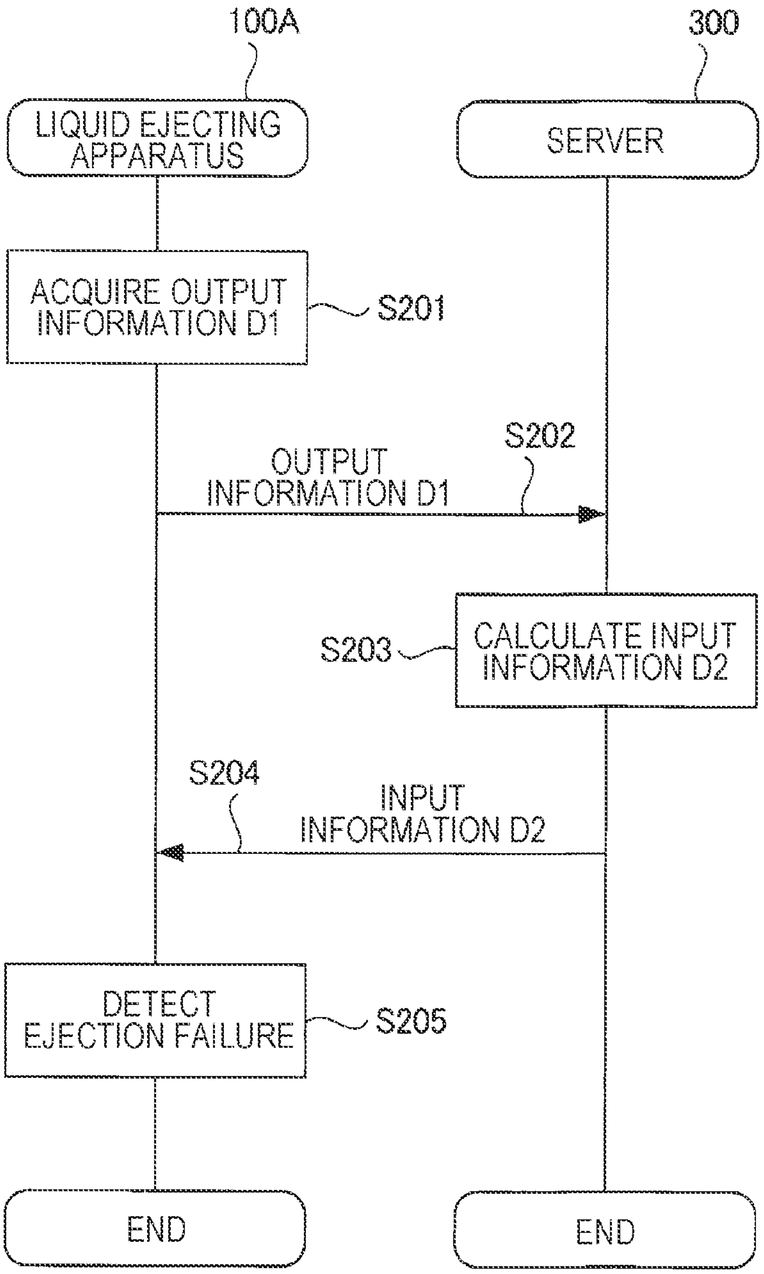
FIG. 11 is a flowchart showing a process of the liquid ejecting system according to the second embodiment.

FIG. 11 is a flowchart showing a process of the liquid ejecting system 10A according to the second embodiment.

In step S201, the processing circuit 119 of the liquid ejecting apparatus 100A acquires the output information D1 by functioning as the acquisition portion 251.

In step S202, the processing circuit 119 of the liquid ejecting apparatus 100A outputs the output information D1 to the server 300 by functioning as the output portion 252. Further, the processing circuit 350 of the server 300 inputs the output information D1 by functioning as the input portion 351.

In step S203, the processing circuit 350 of the server 300 calculates the input information D2 by functioning as the calculation portion 352.

In step S204, the processing circuit 350 of the server 300 transmits the input information D2 to the liquid ejecting apparatus 100A by functioning as the output portion 353. Then, the processing circuit 350 of the server 300 ends the entire process. Further, the processing circuit 119 of the liquid ejecting apparatus 100A inputs the input information D2 by functioning as the input portion 253.

In step S205, the processing circuit 119 of the liquid ejecting apparatus 100A detects the ejection failure in the liquid ejecting apparatus 100A based on the input information D2 and the residual vibration information D3, by functioning as the detection portion 254. Then, the processing circuit 119 of the liquid ejecting apparatus 100A ends the entire process.

After step S205, the processing circuit 119 of the liquid ejecting apparatus 100A may display the detection result of the ejection failure in the liquid ejecting apparatus 100A on a display device (not shown) provided in the liquid ejecting apparatus 100A. Alternatively, the processing circuit 119 of the liquid ejecting apparatus 100A may output the detection result of the ejection failure in the liquid ejecting apparatus 100A to the first processing apparatus 200A, and the processing circuit 250A of the first processing apparatus 200A may display the detection result on the display device 210.

2-5. Effect of Liquid Ejecting System

In the liquid ejecting system 10B according to the present embodiment, the input portion 253 and the connection portion 171 are provided in the liquid ejecting apparatus 100.

With the liquid ejecting system 10A having the above-mentioned configuration, it is possible to input the input parameter from the server 300 to the liquid ejecting apparatus 100A.

Further, the head unit 110 according to the present embodiment includes the pressure chamber C, the drive element 111*f* driven by the applied drive waveform, and the nozzle N through which a liquid is ejected by a pressure applied in the pressure chamber C by drive of the drive element 111*f*. The head unit 110 includes the connection portion 171 that is connected to the server 300 through a network. Further, the head unit 110 includes the input portion 253 in which the input parameter for detecting an ejection failure of a liquid based on the residual vibration of the vibration plate 111*e* is input from the server 300 through the connection portion 171.

With the liquid ejecting system 10A having the above-mentioned configuration, it is possible to input the input parameter from the server 300 to the head unit 110.

3. THIRD EMBODIMENT

Hereinafter, a third embodiment of the present disclosure will be described. In the embodiment illustrated below, elements whose actions or functions are similar to those of the first embodiment will be denoted by the same reference numerals used in the description of the first embodiment and detailed description thereof will be omitted as appropriate.

3-1. Outline of Liquid Ejecting System

Figure 12:
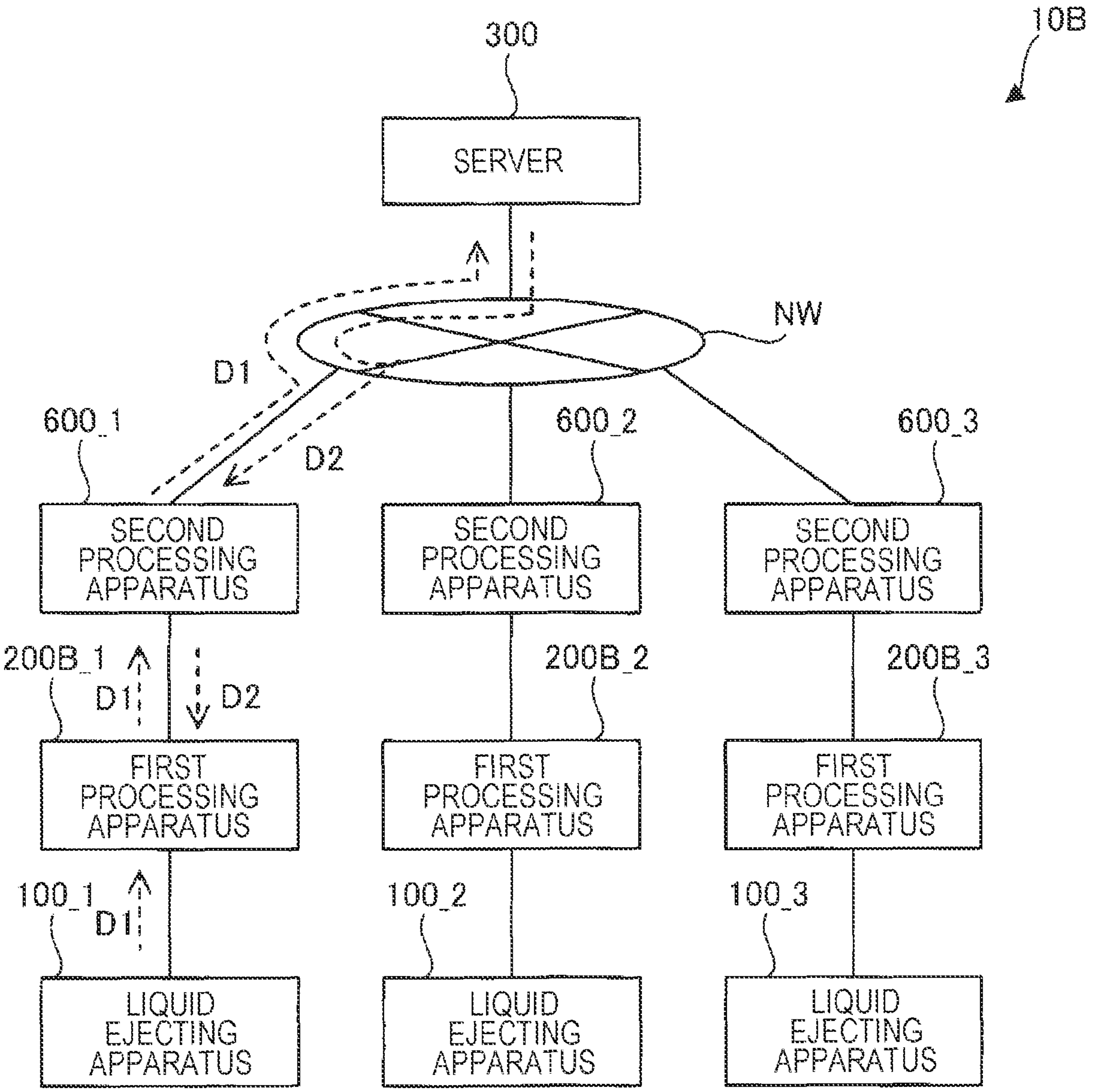
FIG. 12 is a schematic diagram showing a configuration example of a liquid ejecting system according to a third embodiment.

FIG. 12 is a schematic diagram showing a configuration example of a liquid ejecting system 10B according to the third embodiment. In the example shown in FIG. 12, the liquid ejecting system 10B includes the liquid ejecting apparatuses 100_1 to 100_3, first processing apparatuses 200B_1 to 200B_3, second processing apparatuses 600_1 to 600_3, and the server 300. In the following, the first processing apparatuses 200B_1 to 200B_3 are collectively referred to as a "first processing apparatus 200B". Similarly, the second processing apparatuses 600_1 to 600_3 are collectively referred to as a "second processing apparatus 600".

The liquid ejecting apparatuses 100_1 to 100_3, the first processing apparatuses 200B_1 to 200B_3, and the second processing apparatuses 600_1 to 600_3 have a one-to-one correspondence with each other. In FIG. 12, three liquid ejecting apparatuses 100_1 to 100_3, three first processing apparatuses 200B_1 to 200B_3, and three second processing apparatuses 600_1 to 600_3 are described, but the numbers thereof are exemplary, and the liquid ejecting system 10B has any number of sets of the liquid ejecting apparatus 100, the first processing apparatus 200B, and the second processing apparatus 600.

In the liquid ejecting system 10B, the first processing apparatus 200B is communicably connected to each of the liquid ejecting apparatus 100 and the second processing apparatus 600 wirelessly or by wire. Further, the second processing apparatus 600 is communicably connected to each of the first processing apparatus 200B and the server 300 wirelessly or by wire. The communication network NW including the Internet may intervene in the connection.

Further, as shown in FIG. 12, output information D1 is transmitted from the liquid ejecting apparatus 100 to the first processing apparatus 200B. Further, the output information D1 is transmitted from the first processing apparatus 200B to the second processing apparatus 600. Further, the output information D1 is transmitted from the second processing apparatus 600 to the server 300. Meanwhile, the input information D2 is transmitted from the server 300 to the second processing apparatus 600. Further, the input information D2 is transmitted from the second processing apparatus 600 to the first processing apparatus 200B.

3-2. Configuration of First Processing Apparatus

Figure 13:
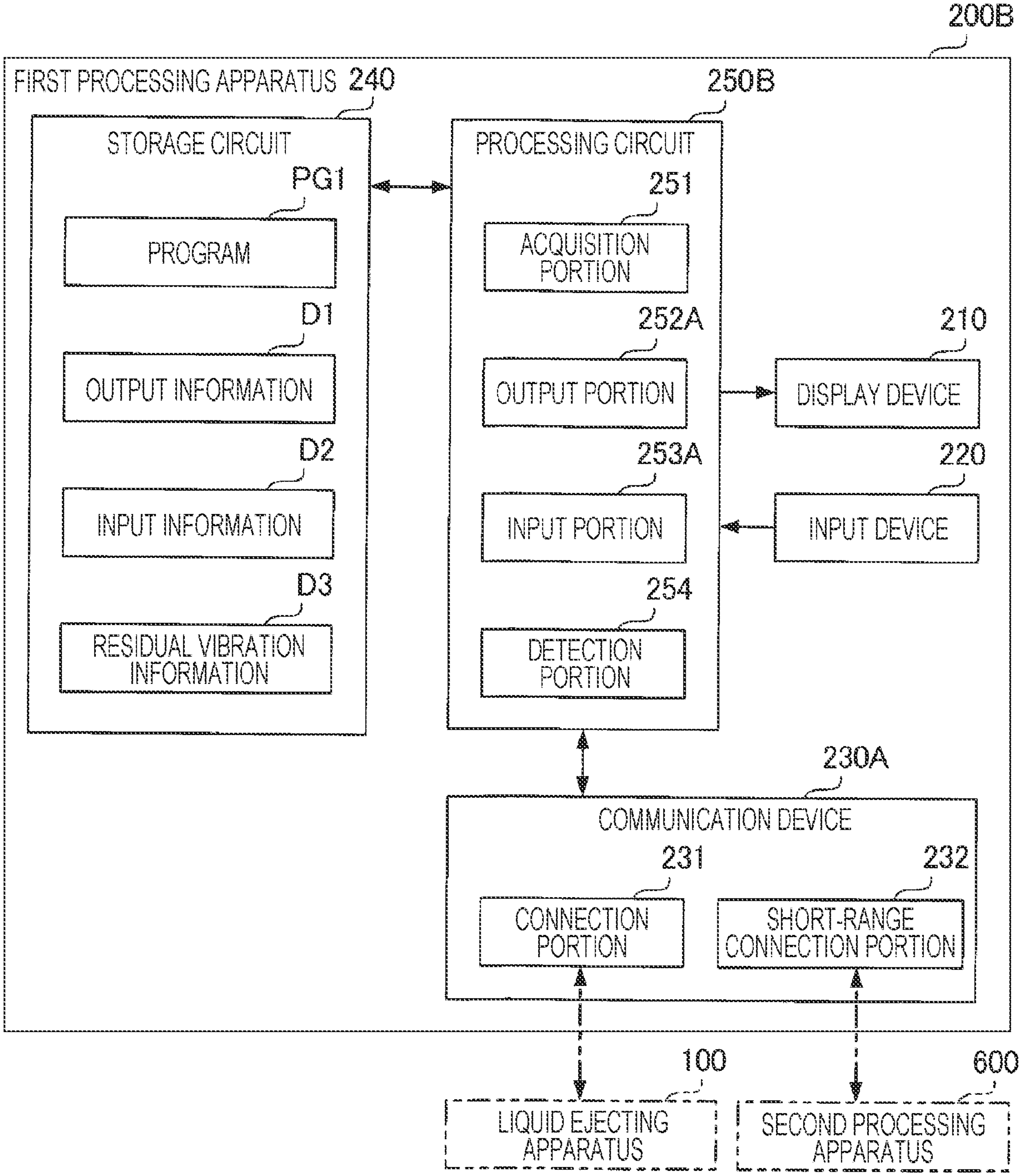
FIG. 13 is a schematic diagram showing a configuration example of a first processing apparatus used in the liquid ejecting system according to the third embodiment.

FIG. 13 is a schematic diagram showing a configuration example of the first processing apparatus 200B used in the liquid ejecting system 10B according to the third embodiment. The first processing apparatus 200B differs from the first processing apparatus 200 according to the first embodiment in that a processing circuit 250B is included instead of the processing circuit 250, and in that a communication device 230A is included instead of the communication device 230.

The communication device 230A is a circuit communicably connected to the liquid ejecting apparatus 100 and the second processing apparatus 600. For example, the communication device 230A is an interface such as a wireless or wired LAN or USB. Further, the communication device 230A receives the output information D1 and the residual vibration information D3 by communicating with the liquid ejecting apparatus 100. That is, the communication device 230A functions as a connection portion 231 that is communicably connected to the liquid ejecting apparatus 100. Further, the communication device 230A transmits the output information D1 and receives the input information D2 by short-range wireless communication with the second processing apparatus 600. That is, the communication device 230A functions as a short-range connection portion 232 that is communicably connected to the second processing apparatus 600. Here, short-range wireless communication is implemented according to specifications such as Bluetooth, Bluetooth low energy (BLE), and near field communication (NFC). Bluetooth is a registered trademark. The communication device 230A may be integrated with the processing circuit 250B.

The processing circuit 250B differs from the processing circuit 250 according to the first embodiment in that an output portion 252A is included instead of the output portion 252 and an input portion 253A is included instead of the input portion 253.

The output portion 252A outputs the acquired output information D1 and residual vibration information D3 to the second processing apparatus 600 through the short-range connection portion 232. The input portion 253A inputs the input information D2 from the second processing apparatus 600 through the short-range connection portion 232.

3-3. Configuration of Second Processing Apparatus

Figure 14:
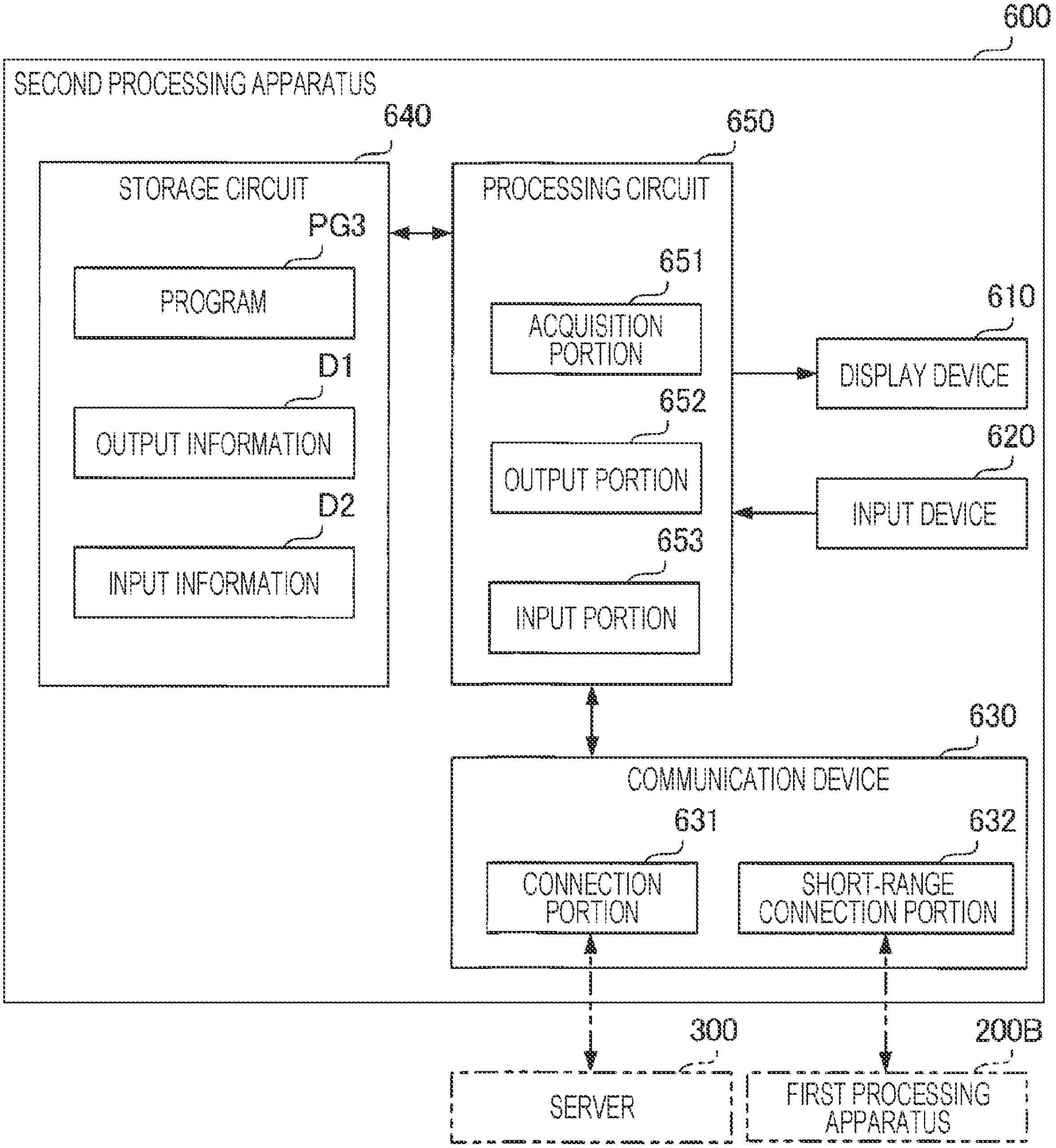
FIG. 14 is a schematic diagram showing a configuration example of a second processing apparatus used in the liquid ejecting system according to the third embodiment.

FIG. 14 is a schematic diagram showing a configuration example of the second processing apparatus 600 used in the liquid ejecting system 10B according to the third embodiment. The second processing apparatus 600 is a mobile terminal such as a smartphone or a tablet, and is assumed to be used by the user of the liquid ejecting apparatus 100. The second processing apparatus 600 acts as an intermediary for transmitting and receiving the output information D1 and the input information D2 between the first processing apparatus 200B and the server 300.

As shown in FIG. 14, the second processing apparatus 600 includes a display device 610, an input device 620, a communication device 630, a storage circuit 640, and a processing circuit 650. The components are communicably connected to each other.

The display device 610 displays various images under the control of the processing circuit 650. Here, the display device 610 has various display panels such as a liquid crystal display panel or an organic EL display panel. The display device 610 may be provided outside the second processing apparatus 600.

The input device 620 is a device that receives operations from the user. For example, the input device 620 has a pointing device such as a touch pad, a touch panel or a mouse. Here, when the input device 620 has a touch panel, the input device 620 may also serve as a display device 610. The input device 620 may be provided outside the second processing apparatus 600.

The communication device 630 is a circuit that is communicably connected to the first processing apparatus 200B and the server 300. For example, the communication device 630 is an interface such as a wireless or wired LAN or USB. Further, the communication device 630 transmits the output information D1 and receives the input information D2 by communicating with the server 300. That is, the communication device 630 functions as a connection portion 631 that is communicably connected to the server 300. Further, the communication device 630 receives the output information D1 by short-range wireless communication with the first processing apparatus 200B. That is, the communication device 630 functions as a short-range connection portion 632 that is communicably connected to the first processing apparatus 200B. The communication device 630 may be integrated with the processing circuit 650. Further, the connection portion 631 is an example of a network connection portion.

The storage circuit 640 is a device that stores various programs executed by the processing circuit 650 and various data processed by the processing circuit 650. The storage circuit 640 has, for example, a hard disk drive or a semiconductor memory. A part or all of the storage circuit 640 may be provided in a storage device or a server outside the second processing apparatus 600.

A program PG3, the output information D1, and the input information D2 are stored in the storage circuit 640 of the present embodiment. A part or all of the program PG3, the output information D1, and the input information D2 may be stored in an external storage device or server of the second processing apparatus 600.

The processing circuit 650 is a device having a function of controlling each portion of the second processing apparatus 600 and a function of processing various data. The processing circuit 650 has a processor such as a CPU. The processing circuit 650 may be constituted by a single processor or may be constituted by a plurality of processors. Further, a part or all of the functions of the processing circuit 650 may be implemented by hardware such as DSP, ASIC, PLD, and FPGA.

The processing circuit 650 functions as an acquisition portion 651, an output portion 652, and an input portion 653 by reading the program PG3 from the storage circuit 640 and executing the program PG3.

The acquisition portion 651 acquires the output information D1 by communicating with the first processing apparatus 200B using the short-range connection portion 632. The acquisition portion 651 stores the acquired output information D1 in the storage circuit 640.

The output portion 652 outputs the acquired output information D1 to the server 300 through the connection portion 631.

The input portion 653 inputs the input information D2 from the server 300 through the connection portion 631. Further, the input portion 653 stores the input information D2 in the storage circuit 640.

3-4. Process of Liquid Ejecting System

Figure 15:
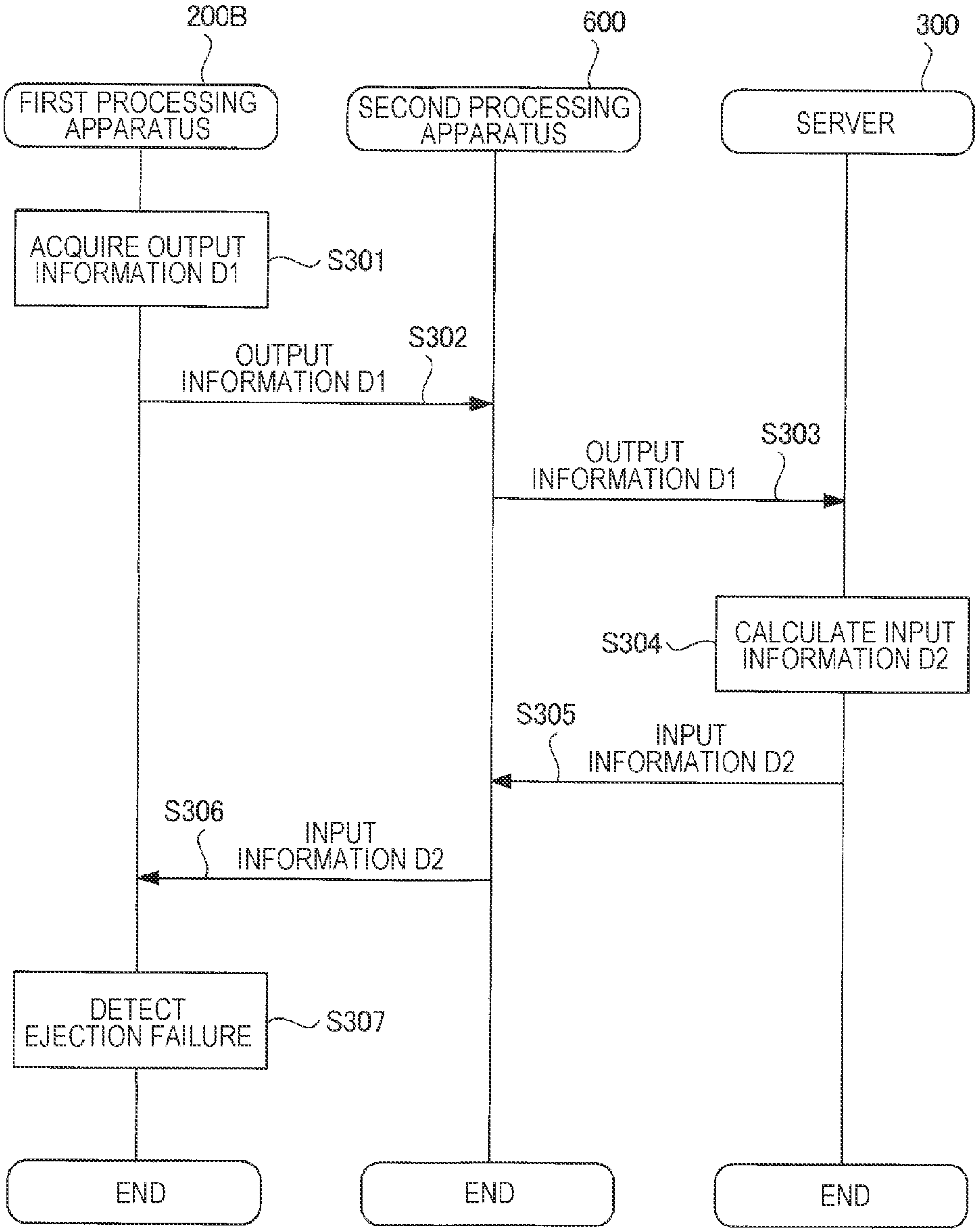
FIG. 15 is a flowchart showing a process of the liquid ejecting system according to the third embodiment.

FIG. 15 is a flowchart showing a process of the liquid ejecting system 10B according to the third embodiment.

In step S301, the processing circuit 250B of the first processing apparatus 200B acquires the output information D1 by functioning as the acquisition portion 251.

In step S302, the processing circuit 250B of the first processing apparatus 200B transmits the output information D1 to the second processing apparatus 600 by functioning as the output portion 252A. Then, the processing circuit 250B of the first processing apparatus 200B ends the entire process. Further, the processing circuit 650 of the second processing apparatus 600 acquires the output information D1 by functioning as the acquisition portion 651.

In step S303, the processing circuit 650 of the second processing apparatus 600 outputs the output information D1 to the server 300 by functioning as the output portion 652. Further, the processing circuit 350 of the server 300 inputs the output information D1 by functioning as the input portion 351.

In step S304, the processing circuit 350 of the server 300 calculates the input information D2 by functioning as the calculation portion 352.

In step S305, the processing circuit 350 of the server 300 outputs the input information D2 to the second processing apparatus 600 by functioning as the output portion 353. Then, the processing circuit 350 of the server 300 ends the entire process. Further, the processing circuit 650 of the second processing apparatus 600 inputs the input information D2 by functioning as the input portion 653.

In step S306, the processing circuit 650 of the second processing apparatus 600 outputs the input information D2 to the first processing apparatus 200B by functioning as the output portion 652. Further, the processing circuit 250B of the first processing apparatus 200B inputs the input information D2 by functioning as the input portion 253A.

In step S307, the processing circuit 250B of the first processing apparatus 200B detects the ejection failure in the liquid ejecting apparatus 100 based on the input information D2 and the residual vibration information D3, by functioning as the detection portion 254. Then, the processing circuit 250B of the first processing apparatus 200B ends the entire process.

After step S307, the processing circuit 250B of the first processing apparatus 200B may display the detection result of the ejection failure in the liquid ejecting apparatus 100 on the display device 210.

3-5. Effect of Liquid Ejecting System

The liquid ejecting system 10B according to the present embodiment further includes the second processing apparatus 600 that can be wirelessly connected to the first processing apparatus 200B. The input portion 653 and the connection portion 631 are provided in the second processing apparatus 600.

With the liquid ejecting system 10B having the above-mentioned configuration, it is possible to input the input parameter from the server 300 to the second processing apparatus 600.

4. FOURTH EMBODIMENT

Hereinafter, a fourth embodiment of the present disclosure will be described. In the embodiment illustrated below, elements whose actions or functions are similar to those of the first embodiment to the third embodiment will be denoted by the same reference numerals used in the description of the first embodiment to the third embodiment and detailed description thereof will be omitted as appropriate.

4-1. Outline of Liquid Ejecting System

Figure 16:
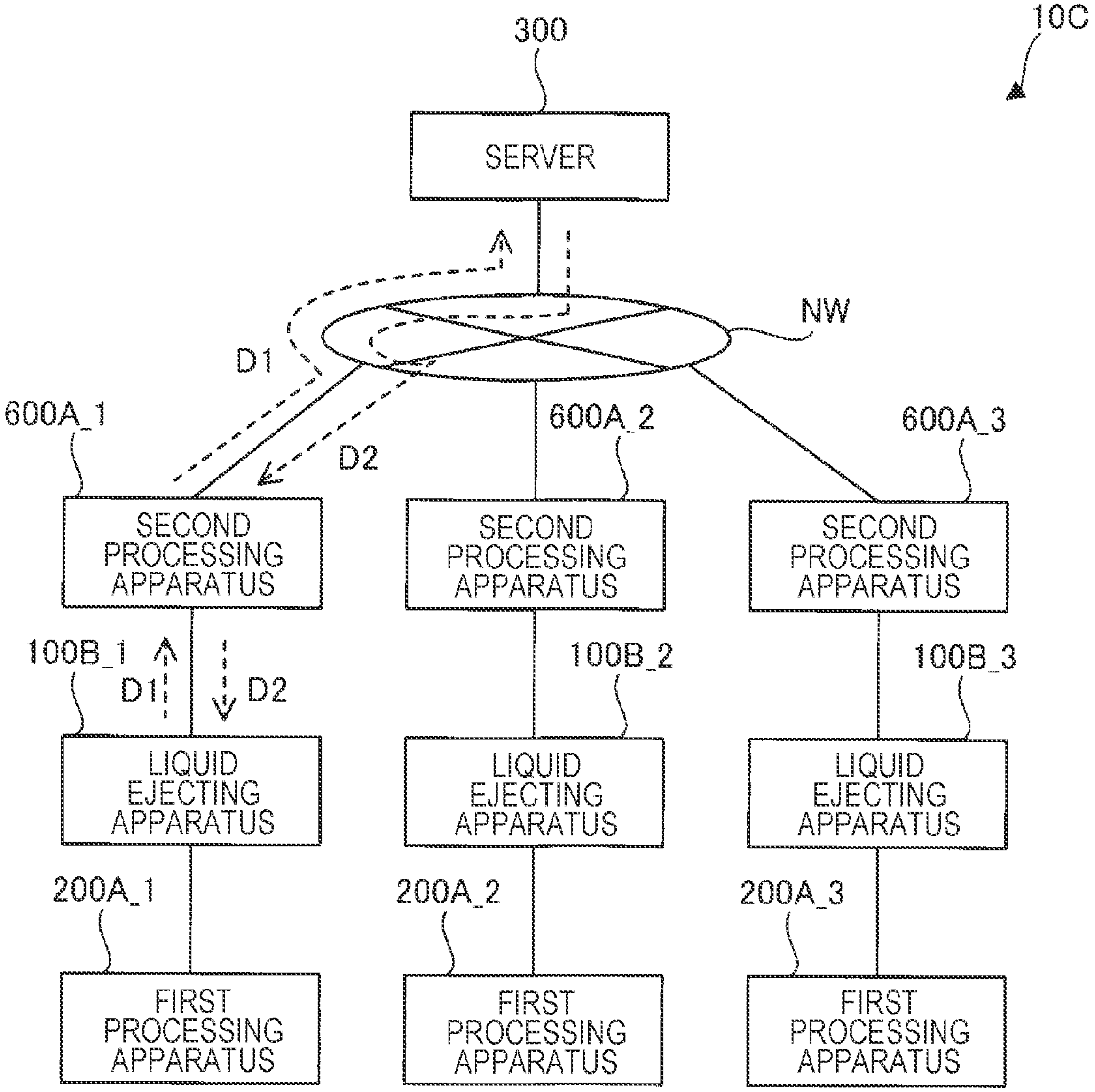
FIG. 16 is a schematic diagram showing a configuration example of a liquid ejecting system according to a fourth embodiment.

FIG. 16 is a schematic diagram showing a configuration example of a liquid ejecting system 10C according to the fourth embodiment. In the example shown in FIG. 16, the liquid ejecting system 10C includes the first processing apparatuses 200A 1 to 200A 3, liquid ejecting apparatuses 100B 1 to 100B 3, second processing apparatus 600A 1 to 600A 3, and the server 300. In the following, the liquid ejecting apparatuses 100B 1 to 100B 3 are collectively referred to as a "liquid ejecting apparatus 100B". Similarly, the second processing apparatuses 600A 1 to 600A 3 are collectively referred to as a "second processing apparatus 600A".

The first processing apparatuses 200A 1 to 200A 3, the liquid ejecting apparatuses 100B 1 to 100B 3, and the second processing apparatuses 600A 1 to 600A 3 have a one-to-one correspondence with each other. In FIG. 16, three first processing apparatuses 200A 1 to 200A 3, three liquid ejecting apparatuses 100B 1 to 100B 3, and three second processing apparatuses 600A 1 to 600A 3 are described, but the numbers thereof are exemplary, and the liquid ejecting system 10D has any number of sets of the first processing apparatus 200A, the liquid ejecting apparatus 100B, and the second processing apparatus 600A.

In the liquid ejecting system 10C, the liquid ejecting apparatus 100B is communicably connected to each of the first processing apparatus 200A and the second processing apparatus 600A wirelessly or by wire. Further, the second processing apparatus 600A is communicably connected to each of the liquid ejecting apparatus 100B and the server 300 wirelessly or by wire. The communication network NW including the Internet may intervene in the connection.

Further, as shown in FIG. 16, the output information D1 is transmitted from the liquid ejecting apparatus 100B to the second processing apparatus 600A. Further, the output information D1 is transmitted from the second processing apparatus 600A to the server 300. Meanwhile, the input information D2 is transmitted from the server 300 to the second processing apparatus 600A. Further, the input information D2 is transmitted from the second processing apparatus 600A to the liquid ejecting apparatus 100B.

4-2. Configuration of Liquid Ejecting Apparatus

Figure 17:
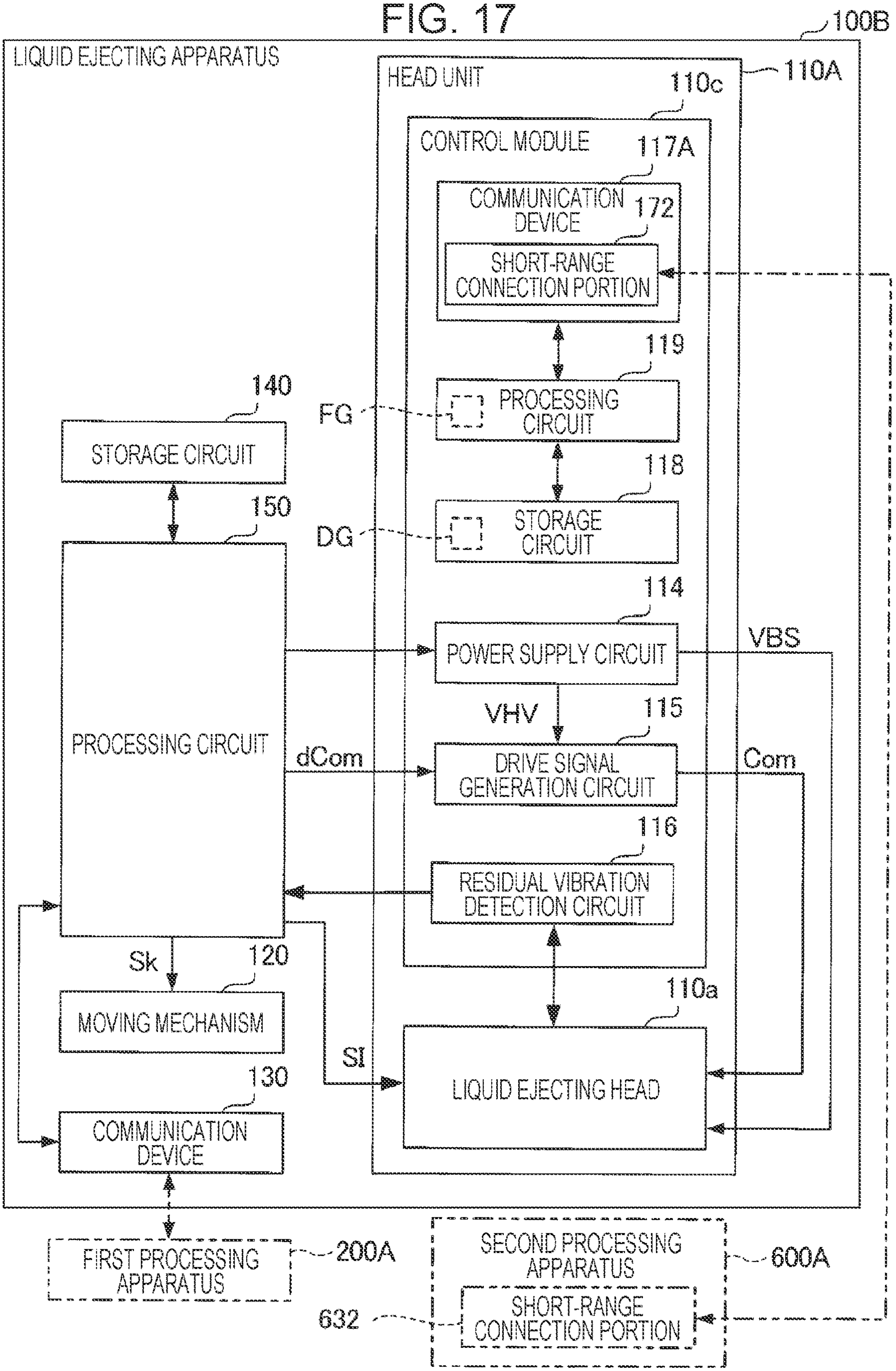
FIG. 17 is a schematic diagram showing a configuration example of a liquid ejecting apparatus used in the liquid ejecting system according to the fourth embodiment.

FIG. 17 is a schematic diagram showing a configuration example of the liquid ejecting apparatus 100B used in the liquid ejecting system 10C according to the fourth embodiment. The liquid ejecting apparatus 100B is different from the liquid ejecting apparatus 100A according to the second embodiment in that a communication device 117A is included instead of the communication device 117.

The communication device 117A is a circuit that is communicably connected to the second processing apparatus 600A. For example, the communication device 117A is an interface such as a wireless or wired LAN or USB. Further, the communication device 117A transmits the output information D1 by short-range communication with the second processing apparatus 600A. That is, the communication device 117A functions as a short-range connection portion 172 that is communicably connected to the second processing apparatus 600A.

4-3. Configuration of Second Processing Apparatus

Figure 18:
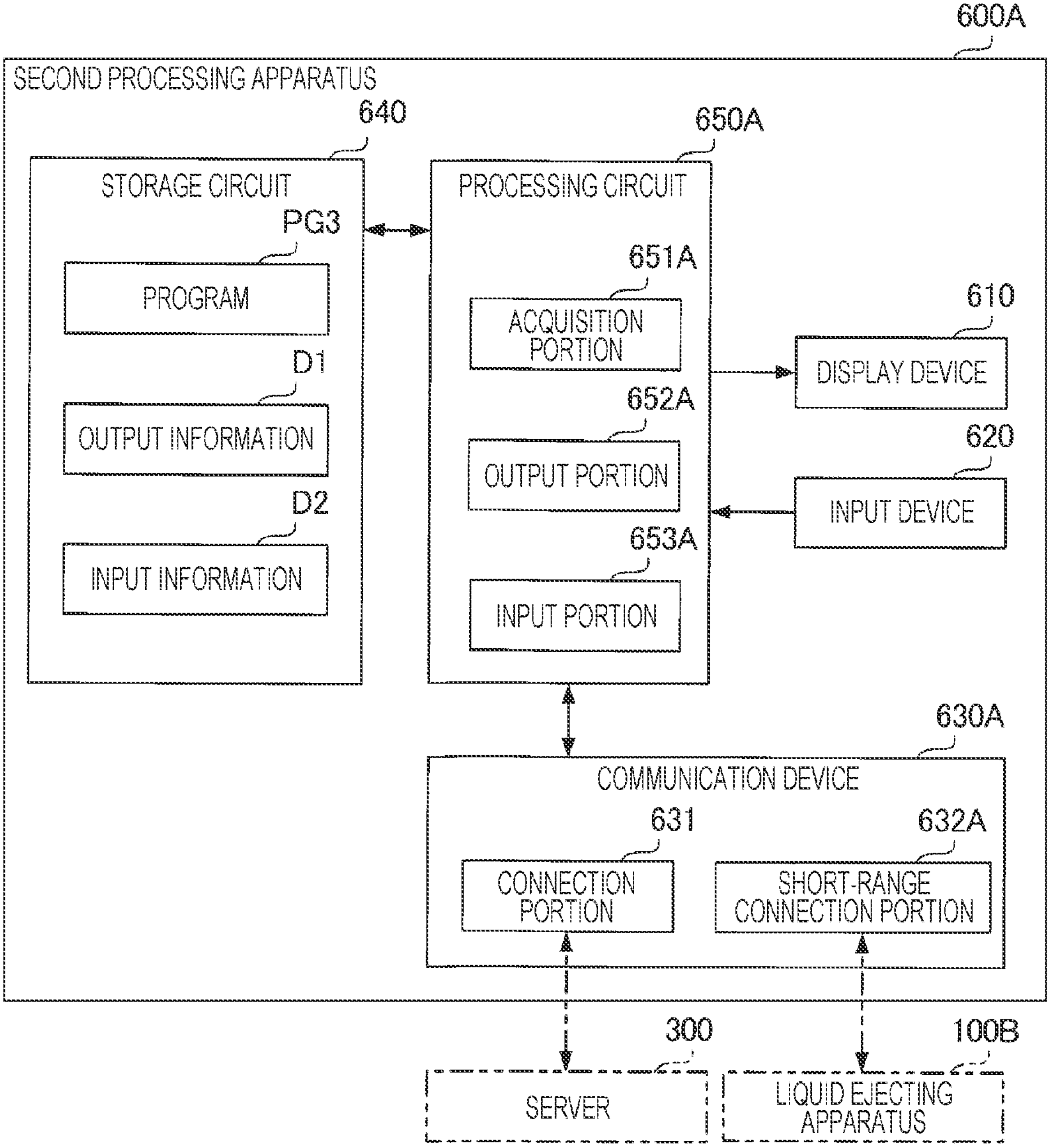
FIG. 18 is a schematic diagram showing a configuration example of a second processing apparatus used in the liquid ejecting system according to the fourth embodiment.

FIG. 18 is a schematic diagram showing a configuration example of the second processing apparatus 600A used in the liquid ejecting system 10C according to the fourth embodiment. The second processing apparatus 600A differs from the second processing apparatus 600 according to the third embodiment in that a processing circuit 650A is included instead of the processing circuit 650, and in that a communication device 630A is included instead of the communication device 630.

The communication device 630A differs from the communication device 630 in that a short-range connection portion 632A is included instead of the short-range connection portion 632. The communication device 630A receives the output information D1 by short-range communication with the liquid ejecting apparatus 100B. That is, the communication device 630A functions as the short-range connection portion 632A that is communicably connected to the liquid ejecting apparatus 100B. The communication device 630A may be integrated with the processing circuit 650A.

The processing circuit 650A differs from the processing circuit 650 in that an acquisition portion 651A is included instead of the acquisition portion 651 and an output portion 652A is included instead of the output portion 652.

The acquisition portion 651A acquires the output information D1 by communicating with the liquid ejecting apparatus 100B using the short-range connection portion 632A. The acquisition portion 651A stores the acquired output information D1 in the storage circuit 640.

The output portion 652A outputs the acquired output information D1 to the server 300 through the connection portion 631. Further, the output portion 652A outputs the input information D2 input from the server 300 to the liquid ejecting apparatus 100B through the short-range connection portion 632A.

4-4. Process of Liquid Ejecting System

Figure 19:
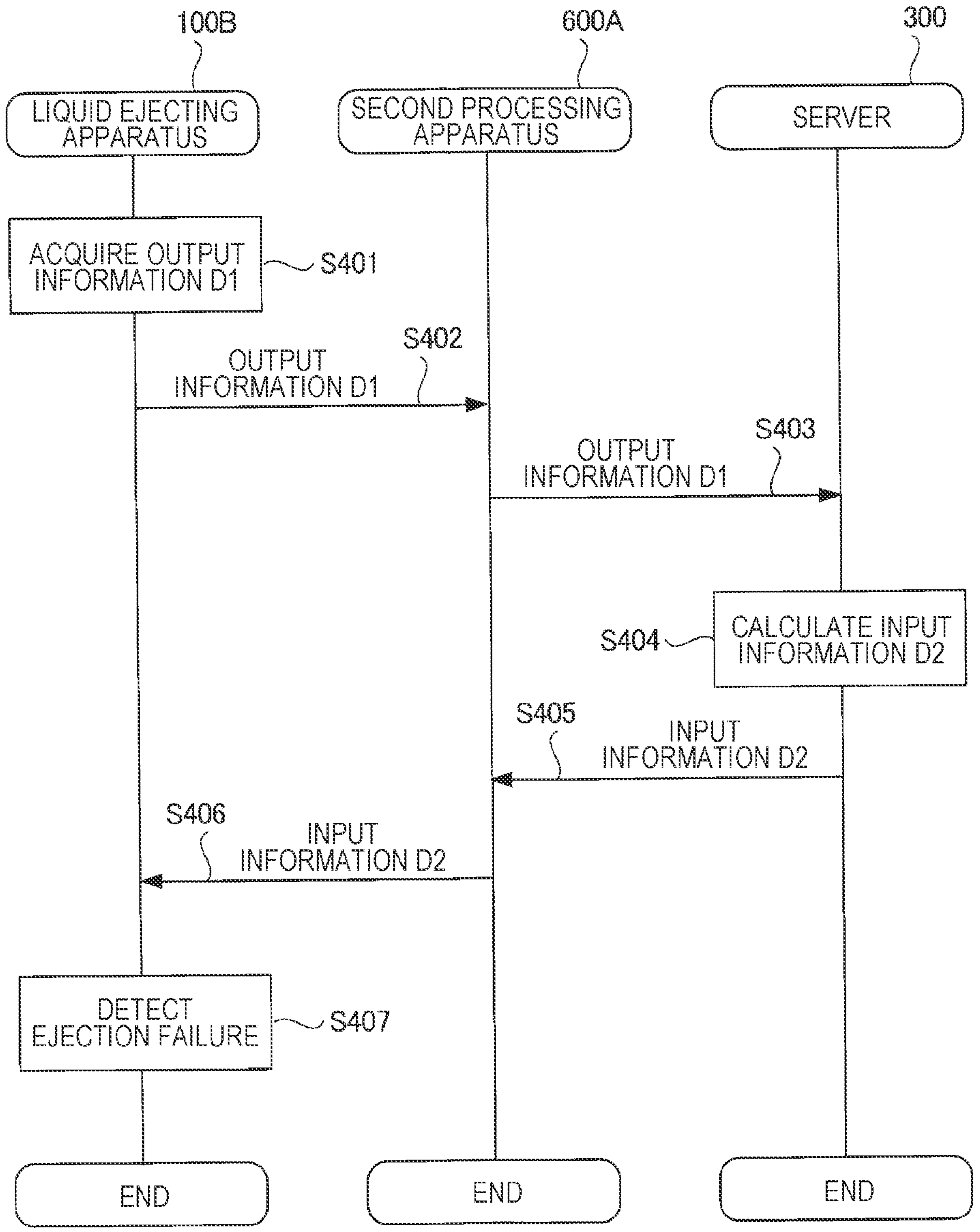
FIG. 19 is a flowchart showing a process of the liquid ejecting system according to the fourth embodiment.

FIG. 19 is a flowchart showing a process of the liquid ejecting system 10C according to the fourth embodiment.

In step S401, the processing circuit 119 of the liquid ejecting apparatus 100B acquires the output information D1 by functioning as the acquisition portion 251.

In step S402, the processing circuit 119 of the liquid ejecting apparatus 100B transmits the output information D1 to the second processing apparatus 600A by functioning as the output portion 252. Then, the processing circuit 119 of the liquid ejecting apparatus 100B ends the entire process. Further, the processing circuit 650A of the second processing apparatus 600A acquires the output information D1 by functioning as the acquisition portion 651A.

In step S403, the processing circuit 650A of the second processing apparatus 600A transmits the output information D1 to the server 300 by functioning as the output portion 652A. Further, the processing circuit 350 of the server 300 inputs the output information D1 by functioning as the input portion 351.

In step S404, the processing circuit 350 of the server 300 calculates the input information D2 by functioning as the calculation portion 352.

In step S405, the processing circuit 350 of the server 300 outputs the input information D2 to the second processing apparatus 600A by functioning as the output portion 353. Then, the processing circuit 350 of the server 300 ends the entire process. Further, the processing circuit 650A of the second processing apparatus 600A inputs the input information D2 by functioning as the input portion 653A.

In step S406, the processing circuit 650A of the second processing apparatus 600A outputs the input information D2 to the liquid ejecting apparatus 100B by functioning as the output portion 652A. Further, the processing circuit 119 of the liquid ejecting apparatus 100B inputs the input information D2 by functioning as the input portion 253.

In step S407, the processing circuit 119 of the liquid ejecting apparatus 100B detects the ejection failure in the liquid ejecting apparatus 100B based on the input information D2 and the residual vibration information D3, by functioning as the detection portion 254. Then, the processing circuit 119 of the liquid ejecting apparatus 100B ends the entire process.

After step S407, the processing circuit 119 of the liquid ejecting apparatus 100B may display the detection result of the ejection failure in the liquid ejecting apparatus 100B on a display device (not shown) provided in the liquid ejecting apparatus 100B. Alternatively, the processing circuit 119 of the liquid ejecting apparatus 100B may output the detection result of the ejection failure in the liquid ejecting apparatus 100B to the first processing apparatus 200A, and the processing circuit 250A of the first processing apparatus 200A may display the detection result on the display device 210.

4-5. Effect of Liquid Ejecting System

The liquid ejecting system 10C according to the present embodiment further includes the second processing apparatus 600A that can be wirelessly connected to the liquid ejecting apparatus 100B. The input portion 653A and the connection portion 631 are provided in the second processing apparatus 600A.

By having the configuration, the liquid ejecting system 10C can input the input parameter from the server 300 to the second processing apparatus 600A.

5. MODIFICATION EXAMPLES

The liquid ejecting system of the present disclosure has been described above based on the illustrated embodiments, but the present disclosure is not limited thereto. Further, the configuration of each portion of the present disclosure can be replaced with any configuration that exhibits the same functions as that of the above-described embodiments, or any configuration can be added.

5-1. Modification Example 1

In the liquid ejecting system 10 according to the first embodiment, it is assumed that the liquid ejecting apparatus 100 and the first processing apparatus 200 are separate apparatuses from each other and are communicably connected to each other wirelessly or by wire. However, the liquid ejecting apparatus 100 and the first processing apparatus 200 may have a configuration in which one is incorporated in the other in a single housing. The same applies to the liquid ejecting system 10A according to the second embodiment to the liquid ejecting system 10C according to the fourth embodiment.

5-2. Modification Example 2

In the liquid ejecting system 10B according to the third embodiment, the first processing apparatus 200B includes the detection portion 254, and thus the ejection failure in the liquid ejecting apparatus 100 is detected. However, the second processing apparatus 600 may detect the ejection failure in the liquid ejecting apparatus 100 by the included detection portion 254, upon acquiring the residual vibration information D3 from the first processing apparatus 200B. Further, the processing circuit 650 of the second processing apparatus 600 may display the detection result of the ejection failure on the display device 610. The same applies to the liquid ejecting system 10C according to the fourth embodiment.

5-3. Modification Example 3

In the liquid ejecting system 10 according to the first embodiment, the first processing apparatus 200 detects an ejection failure in the liquid ejecting apparatus 100. In the liquid ejecting system 10A according to the second embodiment, the liquid ejecting apparatus 100A detects an ejection failure in itself. In the liquid ejecting system 10B according to the third embodiment, the first processing apparatus 200B detects an ejection failure in the liquid ejecting apparatus 100. In the liquid ejecting system 10C according to the fourth embodiment, the liquid ejecting apparatus 100B detects an ejection failure in itself. However, when the server 300 includes the detection portion, the ejection failure in the liquid ejecting apparatuses 100 to 100B may be detected. In this case, the input parameter for specifying the drive element 111*f* in which the ejection failure occurs for the first processing apparatus 200, the liquid ejecting apparatus 100A, the first processing apparatus 200B, or the liquid ejecting apparatus 100B is input from the server 300.

What is claimed is:

1. A liquid ejecting system comprising:

a head unit that includes a pressure chamber, a drive element driven by an applied drive waveform, a vibration plate that vibrates by drive of the drive element, and a nozzle through which a liquid is ejected by a pressure applied in the pressure chamber by vibration of the vibration plate; and an input portion to which an input parameter for detecting an ejection failure of the liquid based on residual vibration of the vibration plate is input from a server through a network connection portion, the input parameter includes a first input parameter regarding a threshold value to be compared with a potential indicating an amplitude of the residual vibration, and the first input parameter is set so that the threshold value becomes smaller as deterioration of the drive element increases.

2. The liquid ejecting system according to claim 1, further comprising:

an acquisition portion that acquires first information regarding the residual vibration of the vibration plate; and a detection portion that detects an ejection failure based on whether or not the potential indicating the amplitude of the residual vibration indicated by the first information exceeds the threshold value.

3. The liquid ejecting system according to claim 1, further comprising an output portion that outputs an output parameter regarding a degree of deterioration of the drive element to the server through the network connection portion.

4. The liquid ejecting system according to claim 3, wherein the output parameter includes a first output parameter regarding the number of times that the drive element is driven.

5. The liquid ejecting system according to claim 4, wherein the output parameter further includes a second output parameter regarding the drive waveform.

6. The liquid ejecting system according to claim 1, further comprising:

a liquid ejecting apparatus that includes the head unit;

a first processing apparatus that is connected to the liquid ejecting apparatus and generates recorded data used to record information regarding the liquid ejecting apparatus; and the server.

7. The liquid ejecting system according to claim 6, wherein the input portion and the network connection portion are provided in the first processing apparatus.

8. The liquid ejecting system according to claim 6, wherein the input portion and the network connection portion are provided in the liquid ejecting apparatus.

9. The liquid ejecting system according to claim 6, further comprising a second processing apparatus configured to be wirelessly connected to the first processing apparatus, wherein the input portion and the network connection portion are provided in the second processing apparatus.

10. The liquid ejecting system according to claim 6, further comprising a second processing apparatus configured to be wirelessly connected to the liquid ejecting apparatus, wherein the input portion and the network connection portion are provided in the second processing apparatus.

11. A liquid ejecting system comprising:

a head unit that includes a pressure chamber, a drive element driven by an applied drive waveform, a vibration plate that vibrates by drive of the drive element, and a nozzle through which a liquid is ejected by a pressure applied in the pressure chamber by vibration of the vibration plate; and an input portion to which an input parameter for specifying the drive element in which an ejection failure occurs is input from a server through a network connection portion, the input parameter includes a first input parameter regarding a threshold value to be compared with a potential indicating an amplitude of the residual vibration, and the first input parameter is set so that the threshold value becomes smaller as deterioration of the drive element increases.

12. A head unit that includes a pressure chamber, a drive element driven by an applied drive waveform, a vibration plate that vibrates by drive of the drive element, and a nozzle through which a liquid is ejected by a pressure applied in the pressure chamber by drive of the drive element, the head unit comprising:

a network connection portion that is connected to a server through a network; and an input portion to which an input parameter for detecting an ejection failure of the liquid based on residual vibration of the vibration plate is input from the server through the network connection portion, the input parameter includes a first input parameter regarding a threshold value to be compared with a potential indicating an amplitude of the residual vibration, and the first input parameter is set so that the threshold value becomes smaller as deterioration of the drive element increases.

* * * * *